(12) United States Patent
Itagaki

(10) Patent No.: US 7,453,609 B2
(45) Date of Patent: Nov. 18, 2008

(54) IMAGE COLOR CORRECTION METHOD AND IMAGE FORMING APPARATUS

(75) Inventor: Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 485 days.

(21) Appl. No.: 11/076,985

(22) Filed: Mar. 11, 2005

(65) Prior Publication Data

US 2005/0206928 A1    Sep. 22, 2005

(30) Foreign Application Priority Data

Mar. 18, 2004   (JP) .............................. 2004-078462

(51) Int. Cl.
*G03F 3/08*  (2006.01)
*H04N 1/60*  (2006.01)
*B41J 29/393*  (2006.01)
*G03G 15/00*  (2006.01)
*G03G 15/01*  (2006.01)

(52) U.S. Cl. ...................... 358/518; 358/1.9; 358/504; 347/19; 399/49; 399/72

(58) Field of Classification Search ................. 358/1.9, 358/1.15, 504, 518, 520, 521, 523, 1.1, 3.01; 347/15, 19, 115, 131, 240, 251; 399/27, 399/28, 29, 30, 49, 58, 72; 101/171; 382/167, 382/274

See application file for complete search history.

(56) References Cited

U.S. PATENT DOCUMENTS

| 5,859,933 | A | 1/1999 | Sasanuma et al. ........... 382/275 |
| 5,963,756 | A | 10/1999 | Sakai et al. .................... 399/39 |
| 6,215,562 | B1 | 4/2001 | Michel et al. ................. 358/1.9 |
| 6,611,666 | B2 | 8/2003 | Regelsberger et al. ......... 399/74 |
| 7,001,038 | B2 * | 2/2006 | Bock et al. ................... 362/125 |
| 2004/0017550 | A1 * | 1/2004 | Yasumi et al. ................ 353/31 |

FOREIGN PATENT DOCUMENTS

| JP | 7-203229 | 8/1995 |
| JP | 9-326940 | 12/1997 |
| JP | 10-193089 | 7/1998 |
| JP | 3276744 | 2/2002 |
| JP | 2003-15472 | 1/2003 |

* cited by examiner

*Primary Examiner*—King Poon
*Assistant Examiner*—Peter L Cheng
(74) *Attorney, Agent, or Firm*—Fitzpatrick, Cella, Harper & Scinto

(57) ABSTRACT

An image color correction method and an image forming apparatus are provided, which are capable of correcting an image color with much higher accuracy. A first light (red light) is irradiated on patch image (for example, an image of cyan color) formed on a sheet by the image forming apparatus, and a second light (red light) is irradiated on the vicinity of the patch image on the sheet, respectively by the image forming apparatus. The light amount of the second light is adjusted so that the brightness of the second light coincides with the brightness of the patch image irradiated by the first light. Based on the light amount adjusted for correcting the color of the image outputted by the image forming apparatus, the image forming condition of the image forming apparatus is set.

19 Claims, 23 Drawing Sheets

FIG. 20

| | CYAN | | MAGENTA | | YELLOW | | BLACK | |
|---|---|---|---|---|---|---|---|---|
| | ◁▷ | ◁▷ | ◁▷ | ◁▷ | ◁▷ | ◁▷ | ◁▷ | ◁▷ |
| 0% | ±0 | 0% | ±0 | 0% | ±0 | 0% | ±0 | |
| | ◁▷ | ◁▷ | ◁▷ | ◁▷ | ◁▷ | ◁▷ | ◁▷ | ◁▷ |
| 10% | ±0 | 10% | ±0 | 10% | ±0 | 10% | ±0 | |
| | ◁▷ | ◁▷ | ◁▷ | ◁▷ | ◁▷ | ◁▷ | ◁▷ | ◁▷ |
| 20% | ±0 | 20% | ±0 | 20% | ±0 | 20% | ±0 | |
| | ◁▷ | ◁▷ | ◁▷ | ◁▷ | ◁▷ | ◁▷ | ◁▷ | ◁▷ |
| 30% | ±0 | 30% | ±0 | 30% | ±0 | 30% | ±0 | |
| | ◁▷ | ◁▷ | ◁▷ | ◁▷ | ◁▷ | ◁▷ | ◁▷ | ◁▷ |
| 40% | ±0 | 40% | ±0 | 40% | ±0 | 40% | ±0 | |

TARGET CHANGE — PRINTER ADJUSTMENT

126

[ NEXT PATCH ] [ NEXT PAGE ] [ REGISTRATION ] [ CANCEL ]

IMAGE COLOR CORRECTION METHOD AND IMAGE FORMING APPARATUS

BACKGROUND OF THE INVENTION

1. Field of the Invention

The present invention relates to an image color correction method and an image forming apparatus, which corrects the color of an image formed by an image forming apparatus. As such image forming apparatus, there can be cited, for example, a copying machine, a printer, a facsimile, and the like which form an image by means of an electrophotographic system or an inkjet system.

2. Related Background Art

In recent years, in general, an image printing technique using an electrophotographic system or an inkjet system has been widely distributed, and attempts at day-to-day improvements of the printing quality and the printing speed have been made.

For example, in the inkjet system, if high-grade media (recording media treated with special processing on the surface) are used, a level not inferior to a photographic paper photograph is reached. Further, in the electrophotographic system, owing to improvement of printing speed and expansion of the color reproduction area, a near-print-quality market has arisen. In offset printing, in addition to cyan (C), magenta (M), yellow (Y), and black (K), inks of red (R), green (G), blue (B), and grey (light color of black) are adapted not in a solid but in a half tone, thereby improving the expressive power of color.

While attempts to improve the printing quality itself have been made in this way, in whichever system is used, as described above, there is a problem of stability of printing quality. Here, among the problems that get in the way of achieving the desired stability of printing quality, are instability of the density and color of individual images at the time of continuous printing ("continuous printing fluctuation"), change of the density and color of the output image after a lapse of time ("time variability"), difference in the density and color of the outputted image owing to fluctuation of the environment in which the image forming apparatuses of the inkjet system and the electrophotographic system are installed ("environmental fluctuation"), difference in the density and color of the image before and after being left alone in a case in which the image forming apparatus is left alone in a power-off state for a long period of time ("long-term fluctuation"), and the like.

For the problems described above, a short-term fluctuation of the density and color of the image owing to the continuous printing fluctuation and the environmental fluctuation can be stabilized to a certain extent by means of a calibration mechanism provided in each apparatus. In the meantime, the long-term fluctuation often exceeds what can be corrected by each apparatus, and it is difficult to perform the calibration automatically.

Hence, to stabilize the long-term fluctuation, there is known an image forming apparatus that reads a predetermined gradation test pattern formed by a copying machine through reading means of the copying machine, and uses density data of each gradation level of the read gradation test pattern, to perform a gradation correction (see Japanese Patent Publication No. 3,276,744).

Further, in U.S. Pat. No. 6,215,562, there is disclosed a technique for performing a color adjustment of the printer at a low cost without using reading means of a scanner, a reader and the like.

Further, as a technique for performing a color adjustment of a printer at a low cost without using reading means of a scanner, a reader and the like, there is available a product under the trademark Visual Cal (registered trademark), which is a calibration function, commercialized by EFI (registered trademark) Electronics Corporation. This can visually make a color adjustment without using an expensive concentration meter, just by the operation of the device's main-body control panel. To be specific, a gradation pattern is formed on a sheet under a predetermined condition, and at the same time, a comparison pattern to be compared is formed in its vicinity, and an operator compares the density of these patterns, so that an image forming condition in the image forming apparatus is corrected.

However, according to the technique disclosed in Japanese Patent Publication No. 3,276,744, reading means such as a scanner, a reader and the like is required, but this is not adaptable to the image forming apparatus not mounted with the reading means such as a printer and the like.

In the meantime, according to a technique disclosed in U.S. Pat. No. 6,215,562, there is a problem in that the above described "pattern to be compared" is formed with a smaller number of lines (so, lower resolution) than in normal image formation, in consideration of the stability of the image density; even an experienced operator may find it difficult to compare and adjust an actual image density. Further, when the density of the gradation pattern formed on the sheet and the comparison pattern are compared, since the patterns are affected by external light such as a fluorescent lamp, a spot light and the like, the comparison of the density of the gradation pattern and the comparison pattern is not performed adequately, thereby causing a correction defect of the image density.

Further, since this method has to use a prescribed paper as the paper on which to form the pattern to be compared with the gradation pattern, no countermeasure can be taken unless this prescribed paper is available.

SUMMARY OF THE INVENTION

An object of the present invention is to provide an image color correction method and an image forming apparatus, which can adequately correct an image color.

This object of the present invention is met by providing an image color correction method, that comprises the steps of forming a predetermined image in a first area on a sheet by using an image forming apparatus to apply colorant material to the sheet, and irradiating a first light from a light irradiating apparatus onto the first area, and a second light onto a second area on the sheet that is in the vicinity of but not on the predetermined image. The method also comprises adjusting a light amount of the second light by comparing a characteristic of the reflected light reflected from the first area with a characteristic of the reflected light reflected from the second area while the first and second areas are illuminated at a level below a predetermined illumination level and adjusting the light amount of the second light until a result of the comparing meets a predetermined criterion. Then an image forming condition of the image forming apparatus is set, based on the adjusted light amount obtained in the adjusting step.

A further object of the present invention is met by providing an apparatus for performing the noted method.

A further object of the present invention is met by providing an image color correction method, that comprises forming a gradation pattern on a sheet by using an image forming apparatus to apply colorant material to the sheet. A reference pattern is projected on the sheet by means of an image projecting apparatus, using a first light amount, and the light amount used for projecting the reference pattern is adjusted, to obtain an adjusted light amount. This is done by comparing the gradation pattern and the reference pattern on the sheet and changing the light amount based on the comparison until the gradation pattern and the reference pattern meet a predetermined condition. Then an image formation condition of the image forming apparatus is set based on the adjusted light amount obtained in the adjusting step. Further objects of the present invention will more fully appear from the following detailed description when the same is read in connection with the accompanying drawings.

BRIEF DESCRIPTION OF THE DRAWINGS

FIG. 20 is a target registration user interface view according to the second embodiment;

DESCRIPTION OF THE PREFERRED EMBODIMENTS

Figure 1:
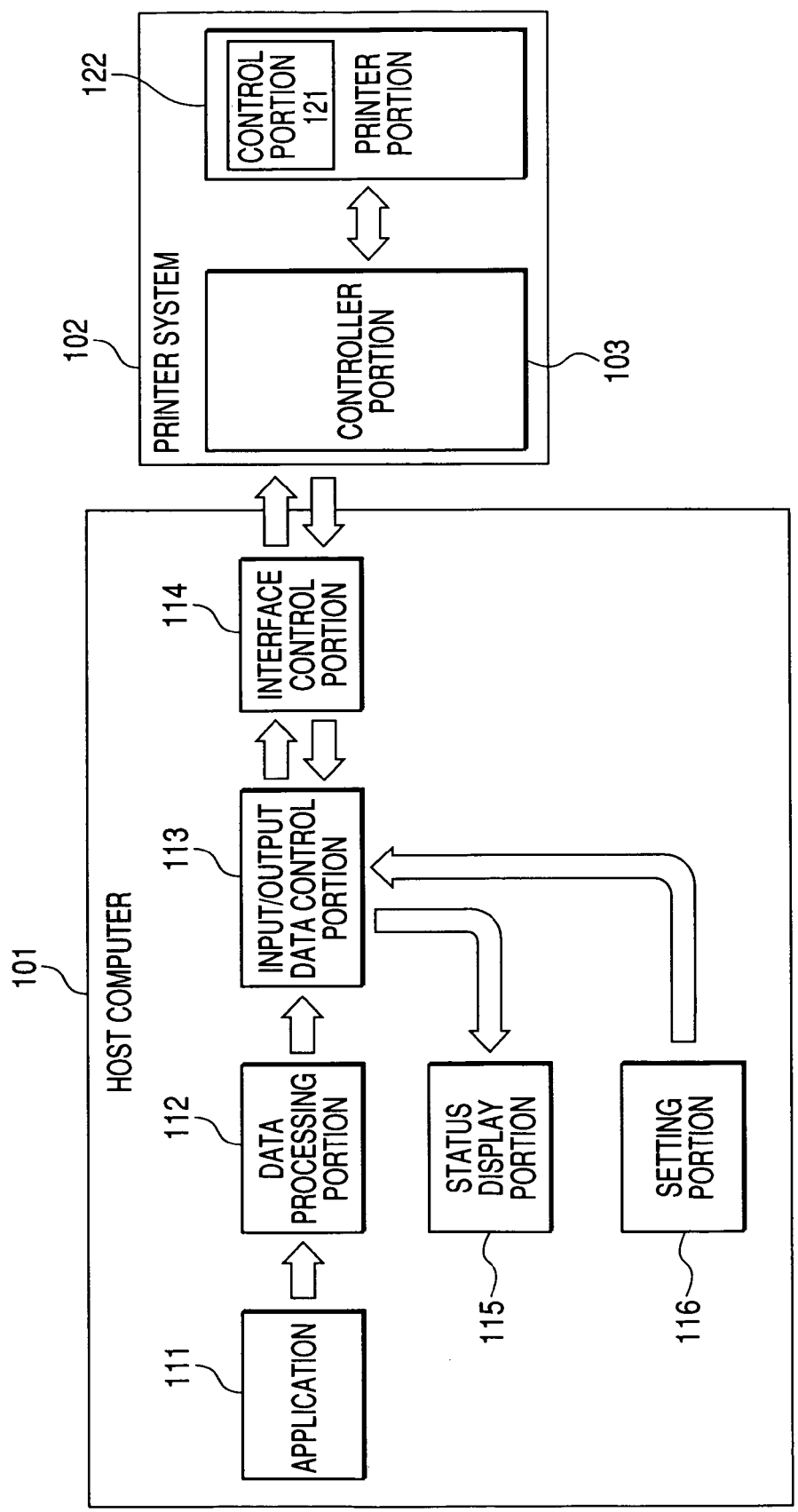
FIG. 1 is a block diagram explaining each module configuration in the interiors of a host computer and a printer system.

A mode for carrying out the present invention will be described below illustratively in detail with reference to the preferred embodiments, shown in the drawings. However, it will be appreciated that, unless particularly described otherwise the scope of the invention is not intended to be limited only to the function, dimension, material and shape of the components described in this embodiment and the relative arrangement thereof. Further, the function, material, shape and the like of the component once described below are the same as the initial description, unless particularly described otherwise subsequently.

First Embodiment

System Configuration

FIG. 1 is a block diagram explaining configurations of the modules in the interiors of a host computer and a printer system (image forming apparatus) in a first embodiment according to the present invention.

A host computer 101 transmits a page description language composed of print data and a control code to a printer system 102. Further, the host computer 101 is connected to the printer system 102 by a two-way communication, and can obtain a current printer status from the printer system 102. The printer system 102 comprises a printer portion 122 including a print mechanism for forming an object visible image on a recording paper and a controller portion 103 including an interface control portion and the like which controls the entire printer system and the interface with the host computer and the like.

An application 111 is software, by which a user prepares object data, and in a case where the operating system of the host computer is, for example, Windows (registered trademark) of Microsoft Corporation, the application 111 also includes a GDI (Graphic Display Interface). Further, the application 111 is executed by a CPU (not shown) for controlling the host computer, and carries out its function. Hereinafter, the various functions carried out by executing the application program will be simply referred to as "the application".

The data processing portion 112 generates the print data and the control data for outputting data transmitted from the application 111 from the printer system 102, and transmits them to an input/output data control portion 113.

The input/output data control portion 113 collects the print data and the control data transmitted from the data processing portion 112 as the page description language (hereinafter referred to as "PDL"), and transmits it to an interface control portion 114. Further, the input/output data control portion 113 analyzes a status of a printer system inputted from the printer system 102 through the interface control portion 114, and transmits display content to a status display portion 115.

The interface control portion 114 performs control of the interface with the printer system 102, and performs control of the transmission of print information comprising the print data and the control code to the printer system 102 and control of the reception of information from the printer system 102.

The status display portion 115 displays the display content transmitted from the input/output data control portion 113 and notifies the user of it.

A setting portion 116 serves as setting means for performing various settings at print-out time, and a command to execute a calibration using an image projection apparatus to be described later can be also issued by this setting portion.

A so-called printer driver portion includes all of the data processing portion 112, the status display portion 115, the setting portion 116 and the input/output data control portion 113.

Figure 2:
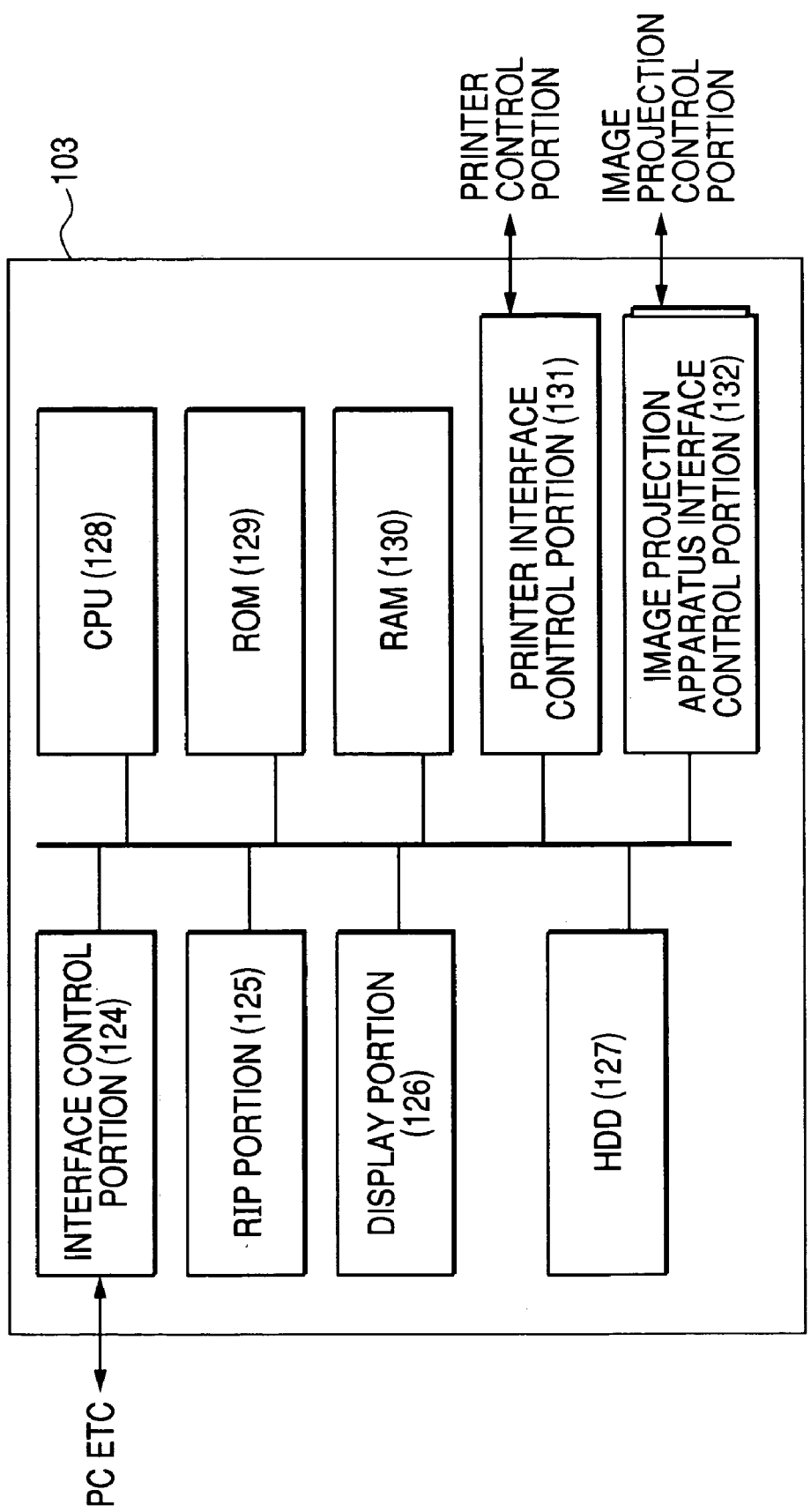
FIG. 2 is a block diagram of each module in the interior of a controller portion.

The controller portion 103 shown in FIG. 2 is built with an interface control portion 124 to which is inputted the page description language, which is print data transmitted from the PC and the like, a RIP portion 125 which converts the page description language into a bit map image recognizable by the printer portion, a hard-disk drive ("HDD") 127, a CPU 128 for controlling the entire control system, a ROM 129, a RAM 130, an image projection apparatus interface control portion 132, the function of which is described below, and the like. A calibration execution order using image data that has been converted into a bit map image at the RIP portion 125 through the printer interface control portion 131 and an image projection apparatus to be described below, later, is transmitted.

The display portion 126 displays a status state of an image forming apparatus and a status state of the controller, and at the same time, it is an operating portion of a touch panel system. In this display portion 126, calibration using the image projection system to be described below can be instructed and executed.

(Printer System)

Figure 3:
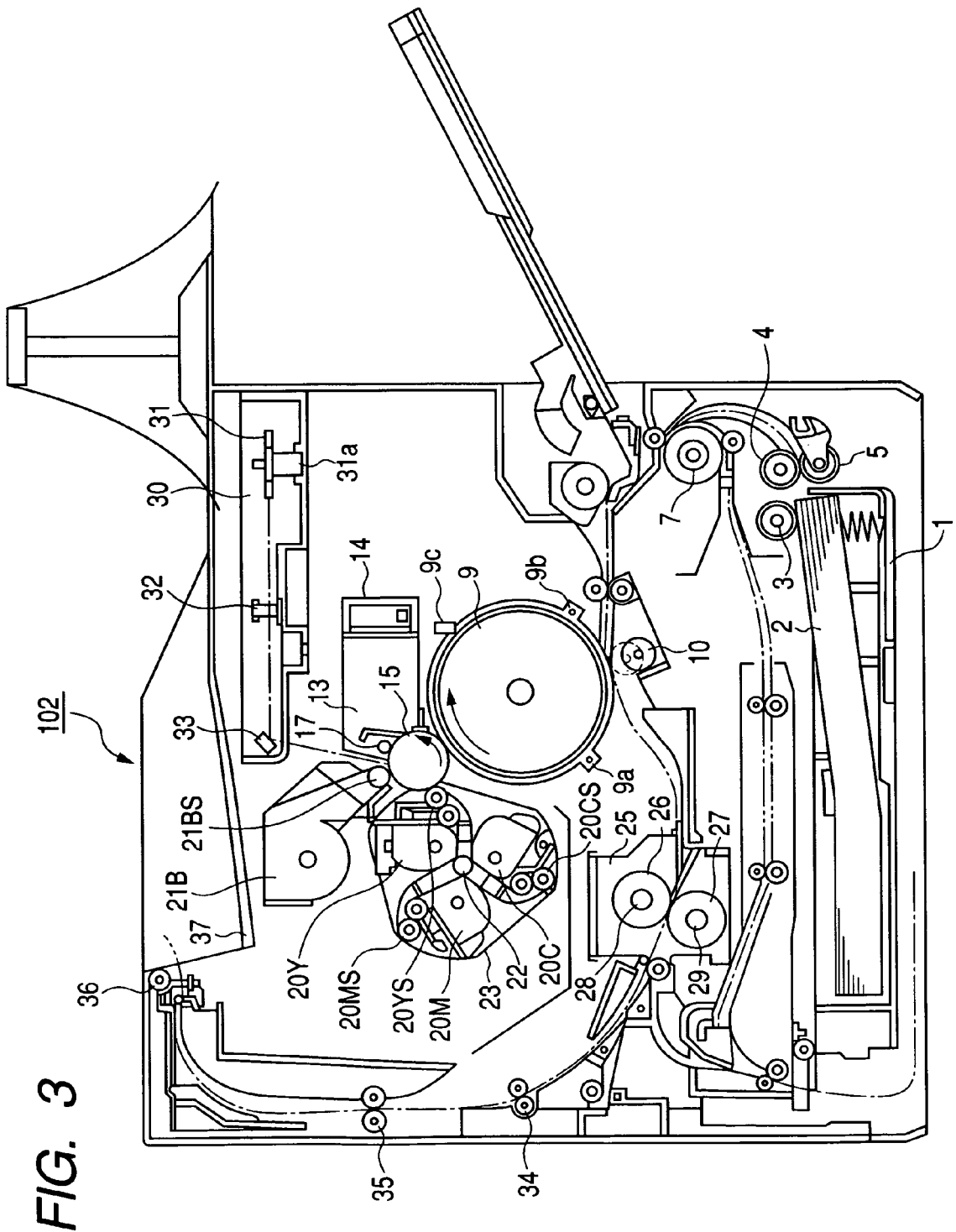
FIG. 3 is a sectional view showing a schematic block diagram of an image forming apparatus.

Next, the printer system 102 as the image forming apparatus will be described. In the present embodiment, the printer system 102, as described above, is configured by the controller portion 103 and the printer portion 122, which itself contains a control portion 103, described below. FIG. 3 is a sectional view showing a schematic block diagram of the image forming apparatus (color laser printer) of an electrophotographic system according to the present embodiment.

The printer system 102 forms an electrostatic latent image by using a polygonal mirror 31 to scan a laser beam modulated by image data for every color obtained based on the print data inputted from the host computer 101 on a photosensitive drum 15. This electrostatic latent image is developed by a toner as a color material, thereby obtaining a visible image. Images formed, respectively, by a yellow toner, a magenta toner, a cyan toner, and a black toner as color materials obtained by the developing are multi-transferred in order onto the intermediate transferring member 9, thereby forming a color visible image. This color visible image is transferred onto a sheet 2, and the color visible image is fixed on the sheet 2.

An image forming portion, serving as image forming means as described above, is configured by a drum unit 13 having the photosensitive drum 15, a primary charging portion having a contact charging roller 17, a cleaning portion, a developing portion, the intermediate transferring portion 9, a sheet cassette 1, a feeding portion including various types of rollers 3, 4, 5, and 7, a transferring portion including a transferring roller 10, and a fixing portion 25.

Exposure to the photosensitive drum 15 is performed in such a manner that the laser beam transmitted from a scanner portion 30 is selectively exposed on the surface of the photosensitive drum 15 so that the electrostatic latent image is formed.

In the scanner portion 30, the modulated laser beam is reflected by the polygonal mirror which is rotated in synchronization with the horizontal synchronization signal of the image signal by a motor 31a, and is irradiated on the photosensitive drum through a lens 32 and a reflecting mirror 33.

The developing portion, which is used to turn the electrostatic latent image into a visible image, comprises three sets of color developing devices 20Y, 20M and 20C for performing the development of yellow (Y), magenta (M) and cyan (C), and one set of the black developing device 21B for developing black (B).

The color developing devices 20Y, 20M and 20C and the black developing device 21B are provided with sleeves 20YS, 20MS, 20CS, and 21BS.

Further, the black developing device 21B is attachably and detachably attached to a printer main body, and the color developing devices 20Y, 20M and 20C are attachably and detachably attached to a developing rotary 23, respectively, which rotates with a shaft of rotation 22 as a center.

Further, the black developing device 21B is mounted with a potential sensor 18 (not shown) between a laser beam receiving position and a sleeve of the black developing device, and detects a charge potential and a latent image potential formed on the photosensitive drum 15.

The sleeve 21BS of the black developing device 21B is disposed at a micro-interval of, for example, approximately 300 μm from the photosensitive drum 15. The black developing device 21B conveys toner by a feeding member built into the device, and at the same time, imparts a charge to the toner by means of frictional charging, so that the outer periphery of the sleeve 21BS rotating clockwise is coated with the toner by a coating blade (not shown). Further, by applying a developing voltage to the sleeve 21B, a developing is performed on the photosensitive drum 15 according to the electrostatic latent image, thereby forming a visible image on the photosensitive drum 15 in black toner.

Three sets of the color developing devices 20Y, 20M, and 20C, at the time of image formation, rotate in company with the rotation of the developing rotary 23, and the predetermined sleeves 20YS, 20MS and 20CS face the photosensitive drum 15 at micro-intervals of approximately 300 μm. In this way, the predetermined color developing devices 20Y, 20M and 20C stop at a developing position, is opposite the photosensitive drum 15, so that the visible image is prepared on the photosensitive drum 15.

At the time of color image formation, the developing rotary 23 rotates for every one rotation of the intermediate transferring member 9, and a developing processing is executed in order of the Yellow developing device 20Y, the magenta developing device 20M and the cyan developing device 20C, and subsequently the black developing device 20B. The intermediate transferring member 9 rotates four times so as to form the visible images in order by means of yellow, magenta, cyan and black toners as color materials, and as a result, a full-color visible image is formed on the intermediate transferring member 9.

The intermediate transferring member 9 is configured in such a manner as to contact the photosensitive drum 15 and rotate accompanied with the rotation of the photosensitive drum 15, and rotates clockwise at the time of color image formation, and receives the multi-transferring of visible images four times from the photosensitive drum 15. Further, the intermediate transferring member 9, in image forming, is brought into contact with a transferring roller 10 to be described later and nips and transfers the sheet 2, so that the color visible image on the intermediate transferring member 9 is multi-transferred onto the sheet 2 at the same time. The outer peripheral portion of the intermediate transferring member 9 is disposed with a TOP sensor 9a for detecting a position relative to a rotational direction of the intermediate transferring member 9, an RS sensor 9b, and a density sensor 9c for detecting the density of the toner image transferred on the intermediate transferring member. The density sensor 9c is used when a γLUT (Gamma Lookup Table) is prepared, which converts a signal value such that the output density characteristic becomes constant for the input signal, and is also used at the Dmax control (control to decide a latent image potential by the relation between the potential sensor detection result and the density) time.

The transfer roller 10 comprises a transfer charging device separably and contactably supported by the photosensitive drum 15, and is covered around a metallic shaft by a medium resistance foam elastic body.

The transferring roller 10, as shown by a solid line in FIG. 3, is isolated downward so as not to disarrange the color visible image during the multi-transferring of the color visible image on the intermediate transferring member 9. After the four color visible images are formed on the intermediate transferring member 9, the transfer roller 10 is positioned upward as shown by the dotted line in the drawing by a cam member (not shown) in exact timing with transfer of this color visible image onto the sheet 2. In this way, the transfer roller 10 is pressure-contacted with the intermediate transferring member 9 by a predetermined pushing force through the sheet 2, and at the same time, a voltage is applied, and the color visible image on the intermediate transferring member 9 is transferred onto the sheet 2.

The setting portion 25, while conveying the sheet 2, fixes the transferred color visible image, and as shown in FIG. 3, comprises a fixing roller 26 for heating the sheet 2 and a pressure roller 27 for pressure-contacting the sheet 2 with the fixing roller 26. The fixing roller 26 and the pressure roller 27 are formed in a hollow shape, and in the interior thereof, there are built-in heaters 28 and 29. That is, the sheet 2 holding the color visible image is conveyed by the fixing roller 26 and the pressure roller 27, and at the same time, with heat and pressure applied, the toner is fixed on the surface.

The sheet 2, after being fixed with the visible image, is subsequently discharged to a discharge portion 37 by discharge rollers 34, 35 and 36, and the image forming operation is completed.

Cleaning means cleans the toner remaining on the photosensitive drum 15 and the intermediate transferring member 9, and any waste toner left after the visible image by the toner formed on the photosensitive drum 15 is transferred onto the intermediate transferring member 9, and any waste toner left after the four color visible images formed on the intermediate transferring member 9 are transferred onto the sheet 2, is stored in a cleaner container 14.

Figure 4:
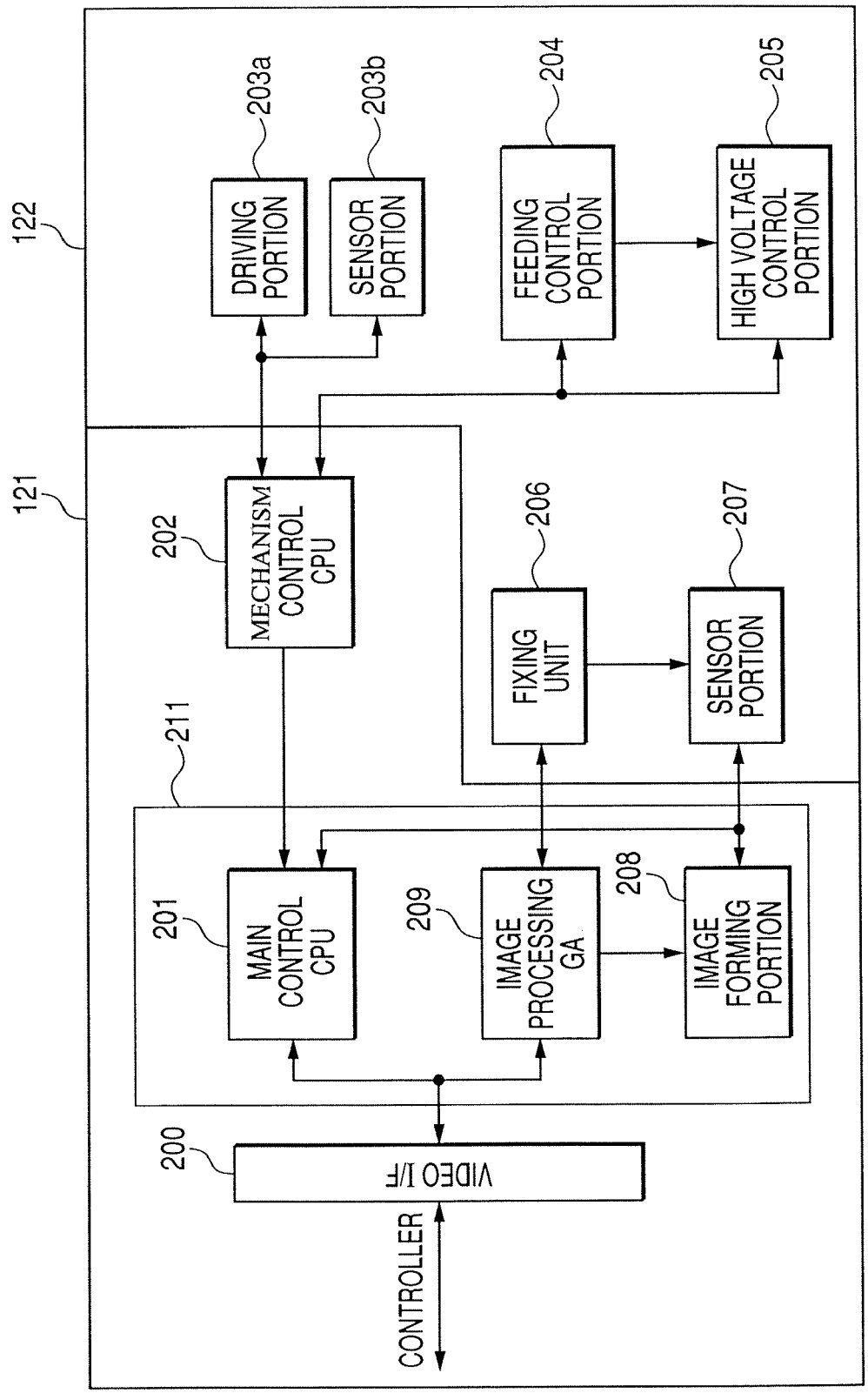
FIG. 4 is a control block diagram of a printer system 102.

FIG. 4 is a control block diagram of the printer system 102 shown in FIG. 3. The printer system 102 is divided into a controller portion 103, a control portion 121 and a printer portion 122.

In the control portion 121, a video interface 200 is an interface with the printer portion 122 and the controller portion 103 shown in FIG. 1.

The printer control portion 211 controls an image processing gate array 209 which subjects the image data received from the interface 200 to γ correction and the like, and an image forming portion 208 for performing an image output such as a laser output, a scanner motor and the like in addition to each of the above described configurations, and at the same time, the printer control portion 211 comprises a main control CPU 201 for controlling a mechanism control CPU 202 as a sub-CPU.

The mechanism control CPU 202 controls a driving portion 203a such as a motor, a clutch, a fan and the like, a sensor portion 203b for a position detection and the like, a feeding control portion 204 for controlling the feeding of a recording paper, and a high voltage control portion 205, respectively.

Further, the printer portion 122 includes the driving portion 203a of the motor and the like, the sensor portion 203b of the position detection, a fixing unit 206, a sensor portion 207 of a temperature and relative humidity sensor and a toner remaining amount detection and the like, the feeding control portion 204, the high voltage control portion 205 for charging and the like.

Figure 5:
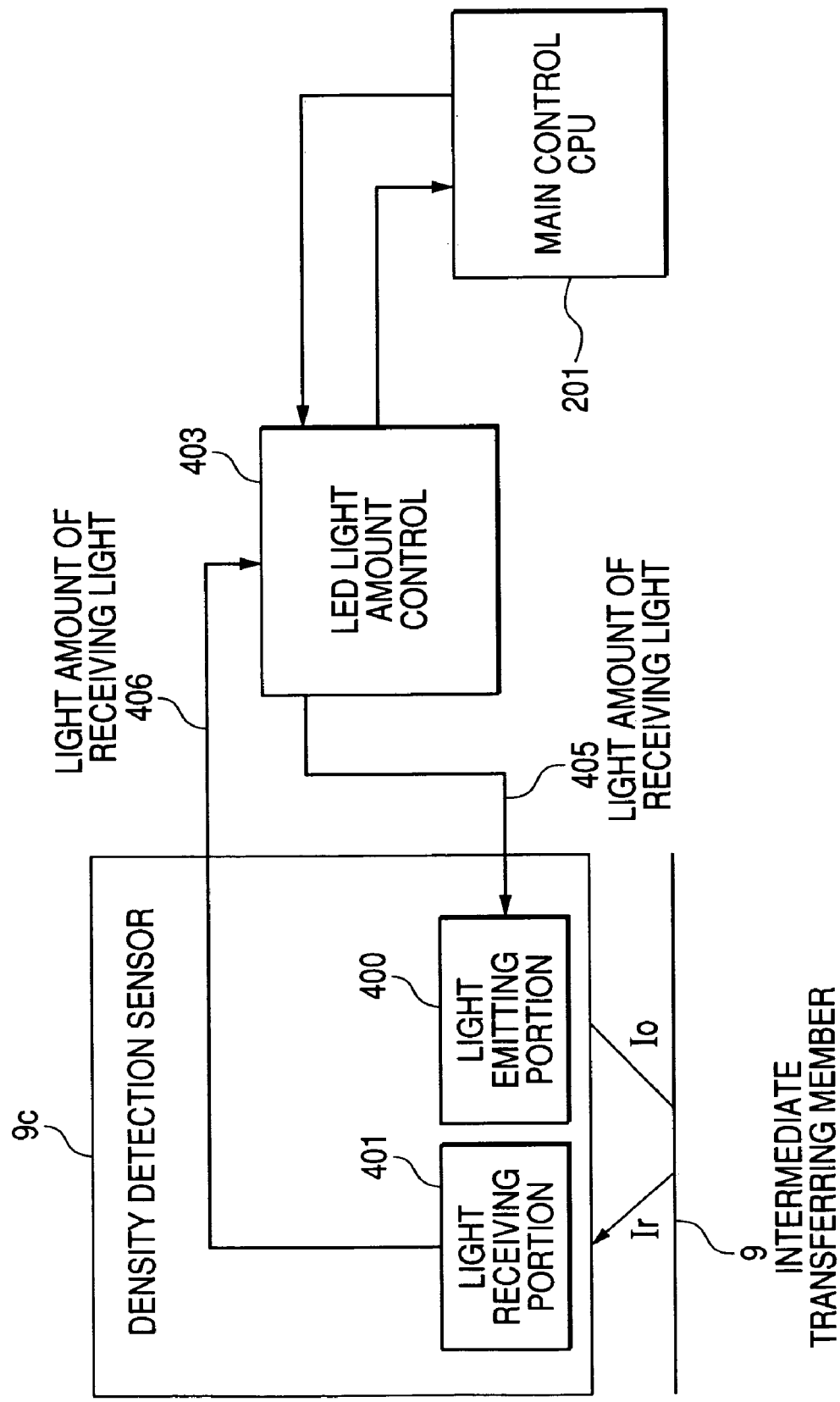
FIG. 5 is a layout drawing of a sensor for detecting the density of an image transferred on an intermediate transferring member of a printer portion.

FIG. 5 is a block diagram showing a configuration for performing a density correction control (color correction control) by using the density sensor 9c, which is included in the sensor portion 207. The density sensor 9c is configured by a light emitting portion 400 and a light receiving portion 401. The light Io irradiated from the light emitting portion 400 is reflected on the surface of the intermediate transferring member 9, and reflected light Ir is measured by the light receiving portion 401. The reflected light Ir measured by the light receiving portion 401 is monitored by an LED light amount control portion 403, and is transmitted to the main control CPU 201. The main control CPU 201 performs a density computation by the measured value of the light source light Io and the reflected light Ir.

The density sensor 9c is used for the color correction control for obtaining a correct color gradation in the recording image. That is, the density of the developer image for each color density detection tentatively formed on the intermediate transferring member 9 is detected by the density sensor 9c. The detection result of that density is fed back to image forming conditions such as an exposed light amount, a developing voltage, a charge voltage and the like, and the density control of each color is performed so as to form a proper color image, thereby obtaining a stabilized image. The density correction control includes a Dmax control and a halftone control. The Dmax control makes the exposed light amount, the developing voltage and the charge voltage variable so as to tentatively form the developer image. The density of that developer image is measured, and the exposed light amount, the developing voltage and the charge voltage value corresponding to the target density of each color are calculated. The halftone control, with the exposed light amount, the developing voltage, and the charge voltage value calculated by the Dmax control taken as a steady value, tentatively prepares developer patch images of several stages in which a pseudo-intermediate halftone processing (referred to also as dither processing, an image forming pattern, and halftoning) such as a screening is performed. The developer patch images are measured, and are returned to the controller. The controller, based on the measured result, prepares a γLUT. The γLUT is a table that corrects the relation between the input and the output so that the output result becomes a target density characteristic for the input signal.

The calibration using the image projection apparatus to be described later changes the above described γLUT and the exposed light amount, the developing voltage value, and the charge voltage value decided by the Dmax control.

By the configuration described above, the printer system 102, in the desired time, performs the correction of the density (color) of the image formed by the developer.

(Image Projection Apparatus)

In the present embodiment, by using a small-sized image projection apparatus (so-called projector) as a light irradiating apparatus (light irradiating means) for irradiating RGB light, a calibration processing for the gradation correction of the image forming apparatus is performed. Although the present embodiment employs an image projection apparatus using a miniature mirror optical system, it is not limited to such a configuration. The image projection apparatus for irradiating the RGB light may have a light amount adjusting function.

Figure 6:
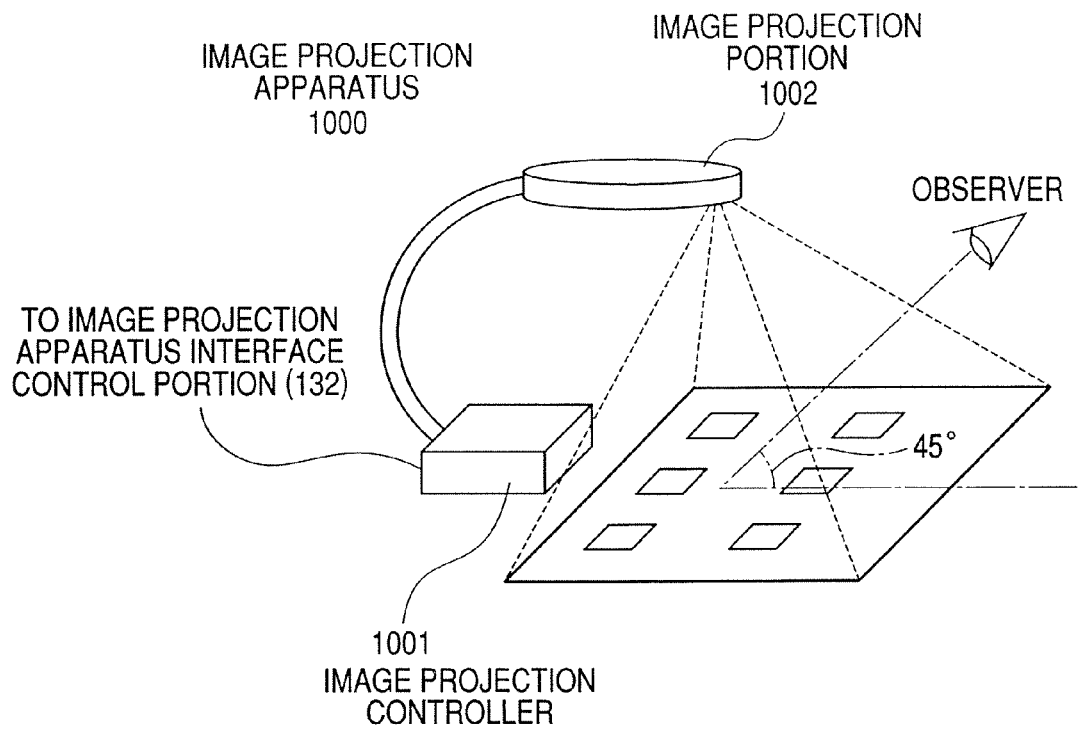
FIG. 6 is an external view of an image projection apparatus.

In FIG. 6 is shown an external view of the image projection apparatus. The image projection apparatus 1000 is a so-called projector, and is configured by an image projection portion 1002 and an image projection controller 1001. The size of the image projection portion 1002 is camera size, and is miniaturized.

Figure 7:
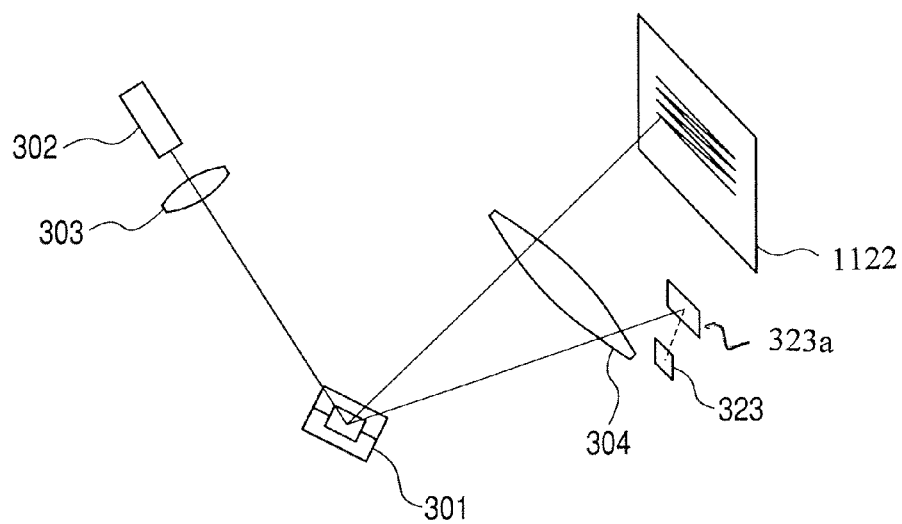
FIG. 7 is a schematic illustration showing an internal structure of the image projection apparatus.

FIG. 7 is a schematic illustration showing an internal structure of the image projection apparatus shown in FIG. 6.

The image projection portion 1002 is a structure comprising a light source 302, a two-dimensional light reflector 301, and a lens or lens groups 303 and 304. The driver portion for driving the light source, a control portion for controlling a timing synchronization and a resonance frequency of the light reflector, a power source (not shown) and the like are stored inside the image projection controller 1001 shown in FIG. 6.

In the present embodiment, a description will be made by using the two-dimensional light reflector capable of two-dimensional scanning.

Laser light (red light, green light, and blue light) of each RGB color emitted upon instruction from the control portion is caused, by using the lens, to perform a two-dimensional scan of a scanned object by using the two-dimensional light reflector, performs a correction of magnification by a scanning position, and projects an image.

Figure 8A:
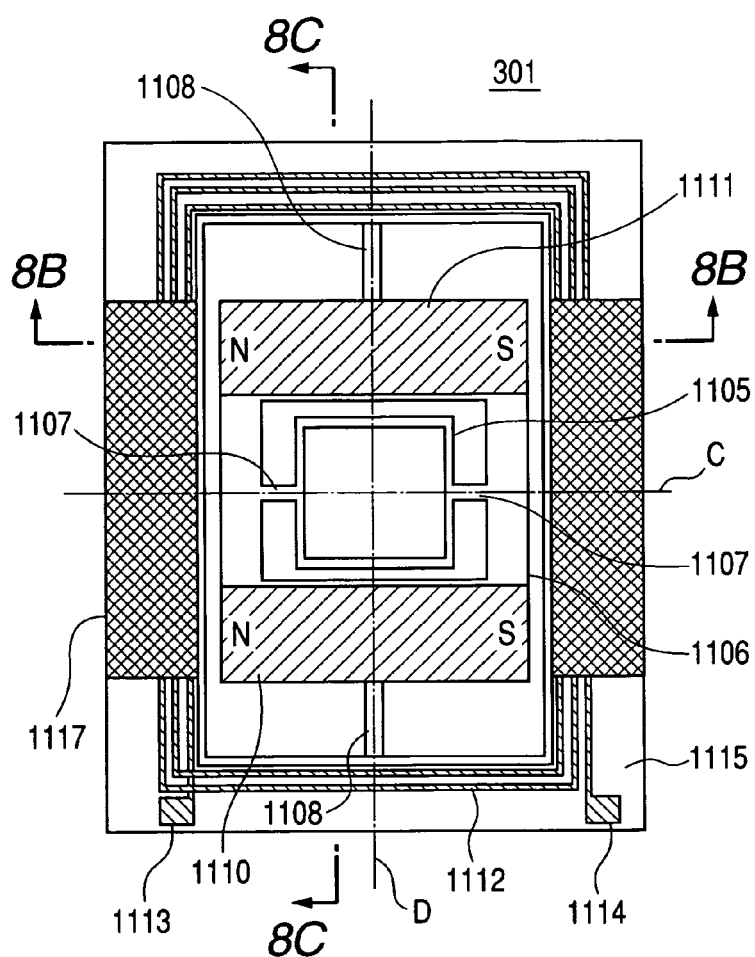
FIG. 8A is a top view of a two-dimensional light reflector 301 provided in the image projection apparatus.
Figure 8C:
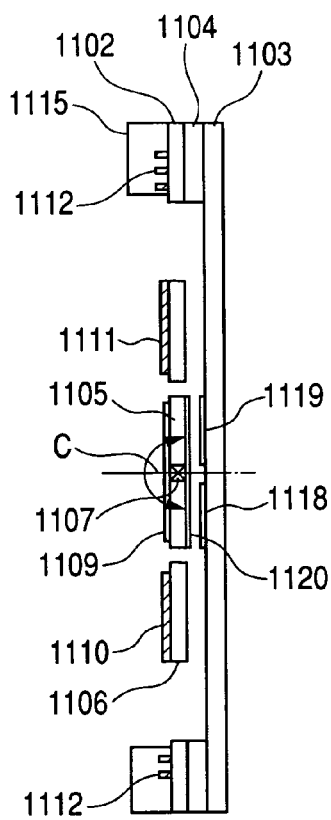
FIG. 8C is a sectional view cut along the line 8C-8C of FIG. 8A.
Figure 8B:
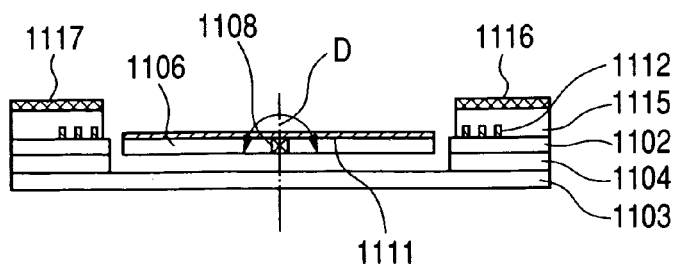
FIG. 8B is a sectional view cut along the line 8B-8B of FIG. 8A.
Figure 9:
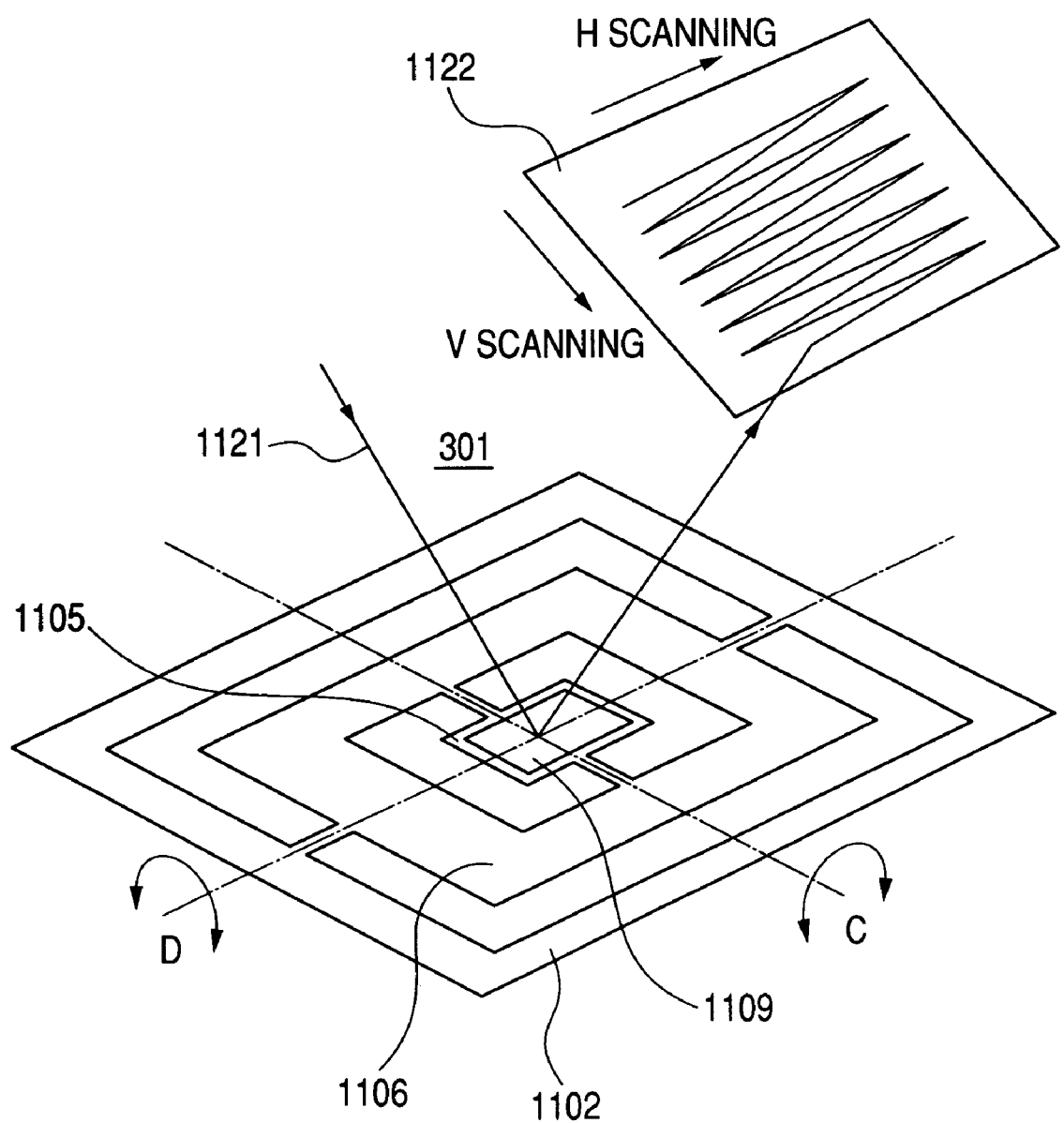
FIG. 9 is a schematic illustration explaining a state of two-dimensional scanning by the light reflector shown in FIGS. 8A to 8C.

FIG. 8A is a top view of the two-dimensional light reflector 301 provided in the image projection apparatus according to the present embodiment. FIG. 8B is a sectional view from section line B-B. FIG. 8C is a sectional view from section line C-C. FIG. 9 is a schematic illustration explaining two-dimensional scanning by the light reflector shown in FIGS. 8A to 8C. In FIG. 9 are depicted only a support substrate 1102 and first and second movable plates 1105 and 1106 supported by the support substrate 1102. The principle of the image projection apparatus will be described below.

The two-dimensional light reflector 301 is prepared by using a micro-machining technique, and comprises a movable plate having a mirror and a hard magnetic film, a plane coil, a fixed core in the form of a soft magnetic film disposed along the plane surface of the plane coil, and an elastic support portion rotatably supporting the movable plate for an indicator substrate.

To be specific, as shown in FIGS. 8A to 8C, the light reflector 301 is configured such that the first and second support plates 1102 and 1103, which are the substrates, are joined to the upper and lower surfaces of a spacer substrate 1104. Surrounded by the frame-shaped first support substrate 1102, the first movable plate 1105 and the second movable plate 1106 are elastically supported by a pair of torsion springs 1107 and 1108 for free torsion vibrating action around a shaft of rotation C and a shaft of rotation D. The one surface of the first movable plate 1105 is provided with a reflecting surface 1109 for reflecting light. The one surface of the second movable plate 1106 has hard magnetic films 1110 and 1111 disposed at both sides of the movable plate 1106 (at positions up and down in FIG. 8A, sandwiching the first movable plate 1105 between them in FIGS. 8A to 8C).

Although the hard magnetic films 1110 and 1111 are disposed symmetrically up and down relative to the shaft of rotation C in FIGS. 8A to 8C, the films may be provided on the whole surface of the second movable plate 1106. The hard magnetic films 1110 and 1111 are magnetized to the left and right in FIGS. 8A to 8C, which are opposed to the soft magnetic films 1116 and 1117 on the first support substrate 1102. On the first support substrate 1102, there is wound a coil 1112 that encircles the space in which the movable plates 1105 and 1106 are mounted. At the trailing ends of the coil, there are pads 1113 and 1114. On the first support substrate 1102 on which the coil 1112 is formed, there is formed an insulating layer 1115. On the insulating layer 1115, the soft magnetic films 1116 and 1117 are positioned next to but somewhat spaced from the magnetic poles of the hard magnetic films 1110 and 1111.

On the second support substrate 1103 are fixed electric poles 1118 and 1119 disposed one to each side of the shaft of rotation C, at a position corresponding to the undersurface (that is, the surface opposite to the reflecting surface) of the first movable plate 1105. The undersurface opposite to the reflecting surface of the first movable plate 1105 is provided with a movable electric pole 1120.

Next, the operating principle of the light reflector of the present embodiment will be described below by using a schematic diagram of the image projection apparatus of FIGS. 8A to 8C and FIG. 9. The present light reflector is a light reflector for two-dimensionally scanning a light ray 1121. By applying a voltage between the fixed electric poles 1118 and 1119 and the movable electric pole 1120, the first movable plate 1105 is allowed to perform a torsional rotation by torsion spring 1107 around the shaft of rotation C. In this way, the light ray 1121 incident on the reflecting surface 1109 in FIG. 9 is scanned on a recording paper 1122 in an H (horizontal) direction. A V (vertical) scanning is performed by the torsion spring 1108 allowing the second movable plate 1106 to torsionally rotate around the shaft of rotation D under forces between the hard magnetic films 1110 and 1111 and the coil 1112.

By changing the current allowed to flow in the coil 1112 for the hard magnetic films 1110 and 1111, which as mentioned are magnetized to the left and right in FIGS. 8A to 8C, the resulting magnetic field generated by the coil 1112 is changed, and a rotational torque is generated in the magnetic poles of the hard magnetic films 1110 and 1111 on the second movable plate 1106, and the second movable plate 1106 is torsionally rotated. In this way, the light ray 1121 incident on the reflected surface 1109 in FIG. 9 is scanned in a V direction on the recording paper 1122. The first movable plate 1105 is provided in the second movable plate 1106 in a nested structure, and a raster scanning, in which the light ray 1121 performs a H scanning by motion of the first movable plate 1105, while also performing a V scanning, is completed on the recording paper 1122. A laser beam is used as the light ray 1121, and a predetermined intensity modulation relating to a timing of the light scanning is performed, so that a two-dimensional image is formed on the recording paper 1122.

Although the oscillated laser beam is reflected on the two-dimensional light reflector 301, and is irradiated onto the recording paper 1122, as shown in FIG. 7, a light amount detection portion 323 provided for controlling the laser beam amount is provided outside of the normal irradiating position. A reflecting mirror 323a is provided for irradiating the laser beam onto the light amount detection portion 323. According to the output result of this light amount detection portion 323, the control portion (not shown) of the image projection apparatus changes the laser beam amount. The reference value of this laser beam amount is adjusted at the time of shipment from the plant, and the light beam amount is adjusted before executing calibration so as to meet the reference value. By means of this adjustment control, temperature characteristics and endurance characteristics of the laser beam, stains on the mirror and the like can be flexibly coped with.

The positional relation between the light irradiating portion of the above-described image projection apparatus and a reference pattern as a predetermined image formed and outputted by the image forming apparatus is such that the light irradiating portion is positioned above the reference pattern. Hence, by observing the diffusion of the light, the shading of a reflected material can be seen. Further, by setting an observational position (position of a hole for viewing by an eye) to be at 45 degrees and the light irradiating portion to be at 90 degrees for the reference pattern, regular reflected light from the image projection portion 1002 can be excluded to a large extent. If the observational position is provided at the side opposite (directly opposite) to the light irradiating portion, that is with the reference pattern in between them, concavity and convexity of the reference pattern (that is, a raster) is estimated, and an exact determination is not possible to make.

Similarly to the image projection apparatus shown in FIG. 3 (not shown in FIG. 6), though a blackout curtain may be used so as to prevent the observation being affected by environmental conditions in the vicinity of the image forming apparatus; also, by turning off any electric bulbs, fluorescent lamps and the like in the room, the blackout curtain may be forgone. The calibration system according to the present embodiment is preferably to be used under conditions of environmental illumination (under the environmental condition in which the image projection apparatus is not operated) below 1.0 lux.

(Principle of Calibration)

In the present embodiment, use of the image projection apparatus provides a means of determining the density of an image outputted from an image forming apparatus, and so the image forming apparatus can be calibrated.

Two typical methods of calibration are a method of calculating the density of each color and adjusting the density to a desired density value through an input/output conversion table called a one-dimensional γLUT, and a method of calculating a L*a*b* (also called "L,A,B", hereinafter referred to as "Lab") of the CIE (Commission International de l'Eclairage) and changing a multi-dimensional LUT (also called "Direct Mapping"). In the present embodiment, the adjustment is performed using the former method.

In the beginning, on the recording paper as a sheet formed with a patch as a predetermined image (gradation pattern) by the printer system 102, a predetermined light is projected onto the patch on the recording paper and also onto a second location in the vicinity of the patch; the image projection apparatus, which is projects this light, can adjust the light amount. Here, the image formed by light having a complementary color relation, that is:

patch cyan→light source red patch magenta→light source green patch yellow→light source blue patch black→light source green, is irradiated onto the patch.

Figure 10:
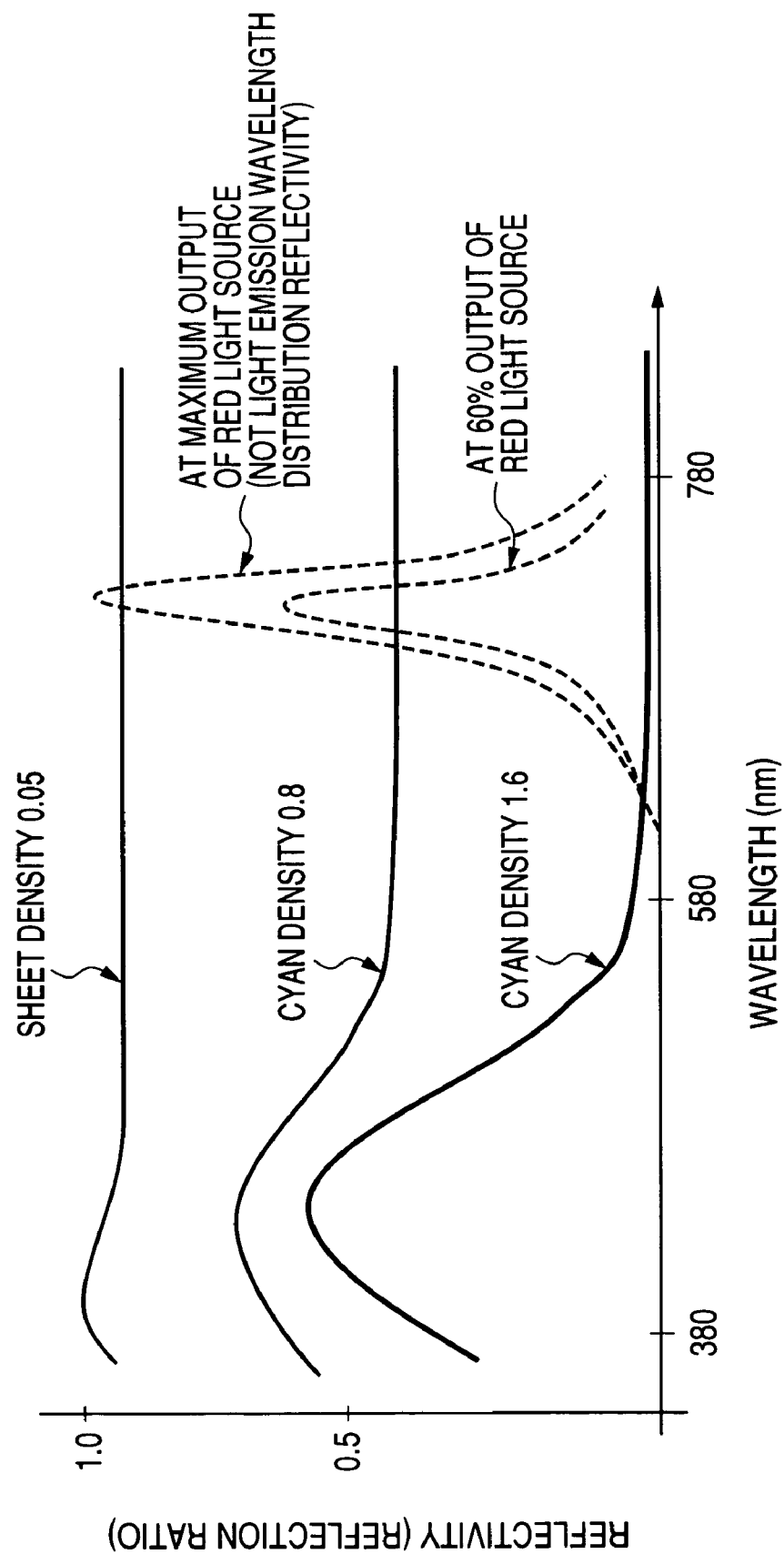
FIG. 10 is a spectral characteristic view of an output image and the image projection apparatus.
Figure 12:
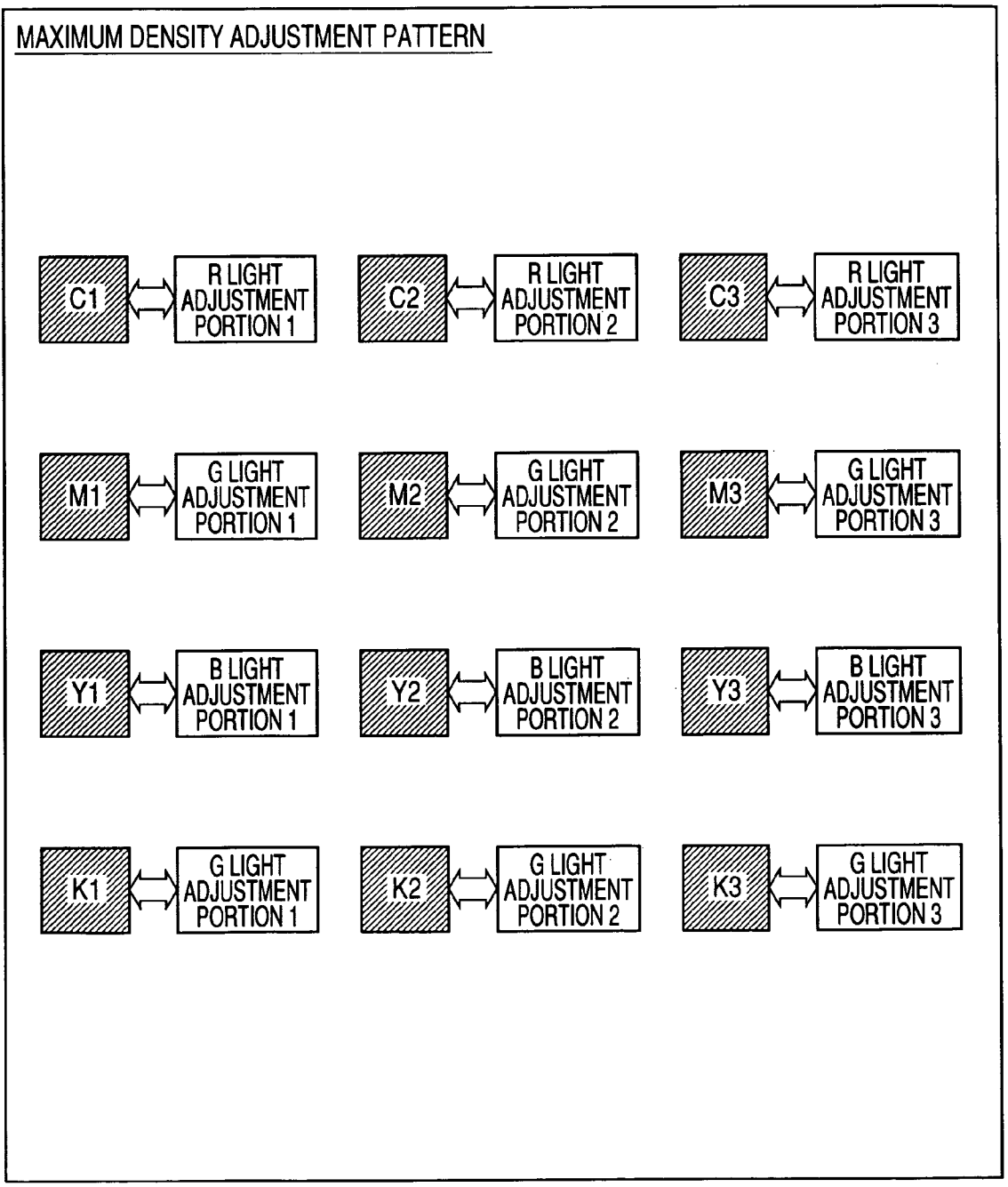
FIG. 12 is the maximum density adjustment pattern according to a first embodiment.

For example, to compare patches of cyan, a red pattern image of high brightness (output signal value 255) adjusted in light amount is irradiated onto patches C1, C2, and C3, as shown in FIG. 12. As shown in FIG. 10, when a cyan density patch of density 1.6 is irradiated with red light in the vicinity of a wavelength λ of 700 nm on the recording paper, the light is not reflected, that is, it is absorbed in the by the patch of cyan owing to the spectral reflection factor.

That is, even when a patch image in cyan exists on the recording paper, since light reflected therefrom is not perceptible if the light is from the red light source, the patch appears to be dark.

Further, the red light irradiated on a second area (a white portion of the recording paper) in the vicinity of the patch, but at a position where no cyan is present, is in the neighborhood of 1.0 in its spectral reflection factor, and so the red light is hardly absorbed, but is almost entirely reflected. That is, the red light is quite visible to an operator.

In the present embodiment, though recording paper is used as a sheet on which a patch is formed, the invention it is not limited to this, but there may instead be used a special paper with its surface coated, and other sheet papers varying in reflectivity by the density of the patch in case each color pattern image is irradiated on the patch.

In this way, the red light is irradiated onto an area formed with the cyan patch on the recording paper and onto a second area (comparing area) in the vicinity of this patch, and the light amount of the red light irradiated onto the latter area in the vicinity of the patch is adjusted by the operator so that the characteristics of the reflecting light from both areas becomes substantially equal. To be specific, the light amount of the red light being irradiated onto the second area is adjusted so as to make the brightness of the reflecting light from both areas substantially equal, thereby obtaining a setting value for the image density correction. To be specific, information corresponding to the light amount of this red light is transmitted from the image projection apparatus to the printer portion, and an image forming condition for forming an image in the printer portion by the control portion is renewed and set. After that, since an image formation is performed in the printer portion under this image forming condition, an image adequate in image density, that is, an image excellent in gradation can be stably formed.

That is, if the light amount of the red light is decreased, the density of the patch can be adjusted and controlled to be in a thick state, and if the light amount is increased, to be in a thin state.

By utilizing this characteristic, a high luminance red light (255 level) is irradiated onto the cyan patch formed on the sheet, and the light amount of the red light as a reference pattern irradiated onto red light adjusting portions 1, 2, and 3 (which are comparison areas) is adjustable by the operator, and the darkness of the patch and the comparison area is made to coincide, and at this time, the red light amount (setting value) irradiated on the comparison area is read out.

Figure 11:
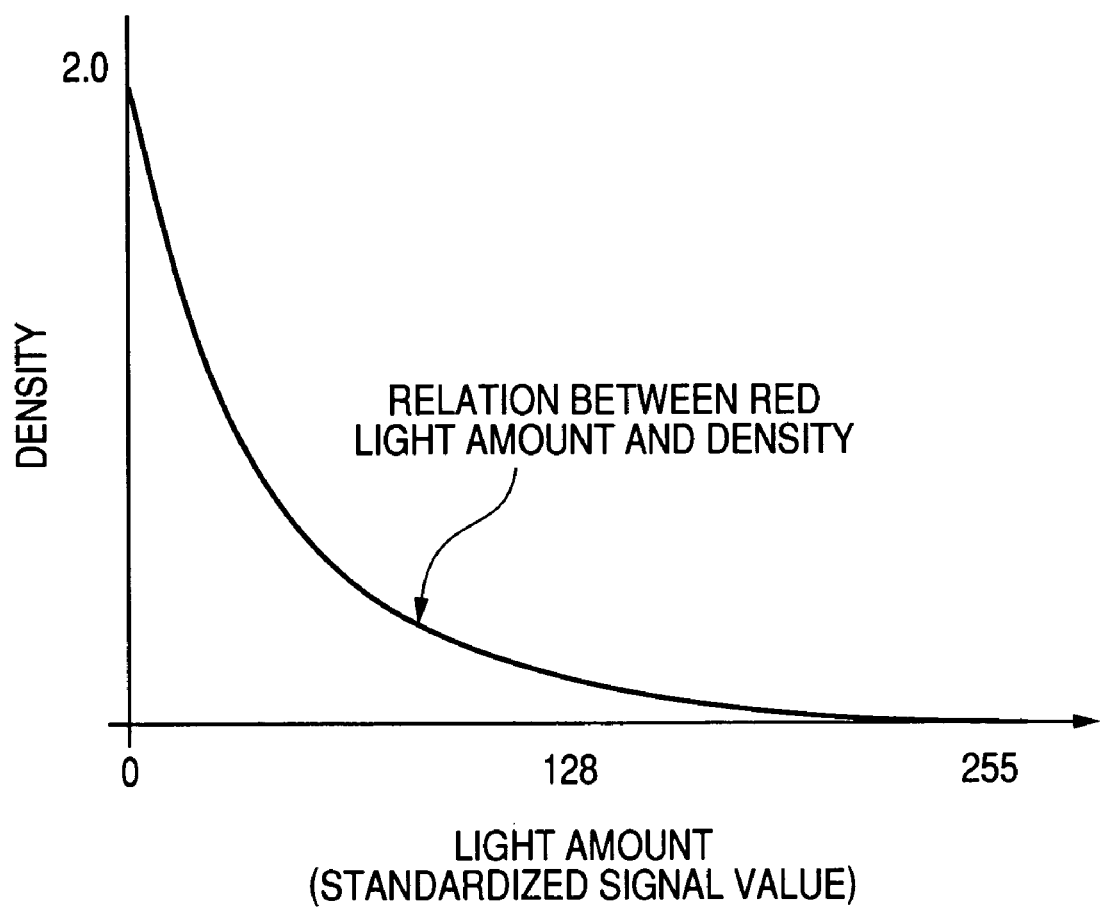
FIG. 11 is a graph showing a relation between a red light amount and a cyan density of the image projection apparatus.

The relation between the read-out light amount (setting value) and the density can be analyzed by means of a one-dimensional table, and if registered in advance, the density of the reference patch can be calculated. The relation between the red light amount and the cyan patch density is shown in FIG. 11. This relation is put into a table, and when the light amount is adjusted by a user as described later, the reference patch density can be calculated from that setting value.

In this way, an actual patch density can be determined without using an expensive measuring tool, and in a case in which the patch formed on the sheet outputted from the image forming apparatus is thinner than a desired target density, the γLUT and the Dmax condition are decided so that the decided target density and the actual patch density coincide, thereby correcting the density of the image outputted from the printer system 102. The deciding method of the above described γLUT and the Dmax condition will be described in detail with reference to a flowchart described below.

The relation between the luminance (signal value in the image projection apparatus) of other colors and the density (patch density outputted by the image forming apparatus) is registered in advance similarly to the cyan patch, and is converted into a density value by using a luminance/density conversion table of magenta, yellow and black, respectively, and is adjusted such that a predetermined target (relation between the input signal and the output density) becomes that target.

(Pattern Image and Details of Calibration)

Figure 13:
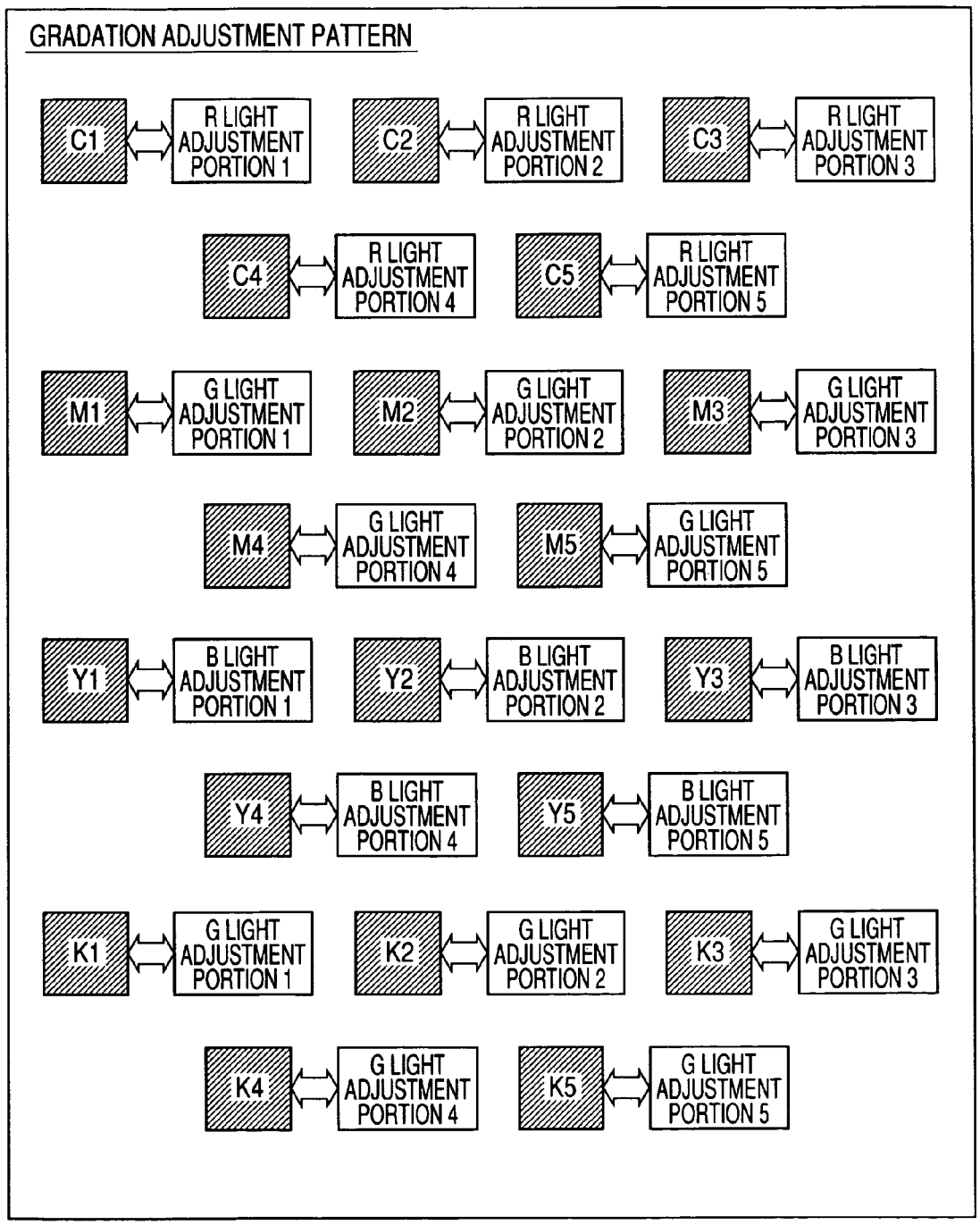
FIG. 13 is a gradation adjustment pattern according to the first embodiment.

In FIGS. 12 and 13 is shown one example of the pattern image. FIG. 12 is a view showing the maximum density adjustment pattern for correcting the maximum density (Dmax), and FIG. 13 is a view showing a gradation adjustment pattern.

There is a space in the area adjacent to each patch, and a comparing projection image is projected on this space, which thus serves as a second area illuminated with a predetermined light the reflection of which is compared with reflection of another light beam from the respective patch. This space is formed with a frame at the same time as the patch is formed, and is easy for the operator to find.

The maximum density adjustment pattern for correcting the Dmax is formed with three patches for each color, and the gradation adjustment pattern is formed with gradation images of five patches (high light up to shadow) for each color. Although three and five are the numbers of patches adopted in consideration of the operability of the user, the apparatus is desirably configured such that the number can be increased or decreased according to the level of the user. However, when a patch size is too small, it is affected by diffused light from the projection image, and an accurate calibration cannot be executed. To describe in greater detail, in a case of comparison to the dark patch of a high density, though the light amount of the comparison projection image is allowed to be close to 0, since the output patch of a high density is given reference light (high luminance reference light), it often does not become darker than a certain limit. Hence, the present embodiment makes it a condition that the patch size is equal at least a two-centimeter angle, and the area in which the comparison image is projected is an area adjacent to the above described patch, and is isolated from the patch of at least one centimeter. Within that area, the patch is formed. In a case where an instruction to increase the number of patches is issued, a plurality of output patches are used.

In the above described example, though the recording paper formed with the patch is placed by the operator in the image projection area of the image projection apparatus, a conveying mechanism may be provided, which automatically conveys the recording paper formed with the patch in the image forming apparatus up to the image projection area.

(Basic Flow)

Figure 17:
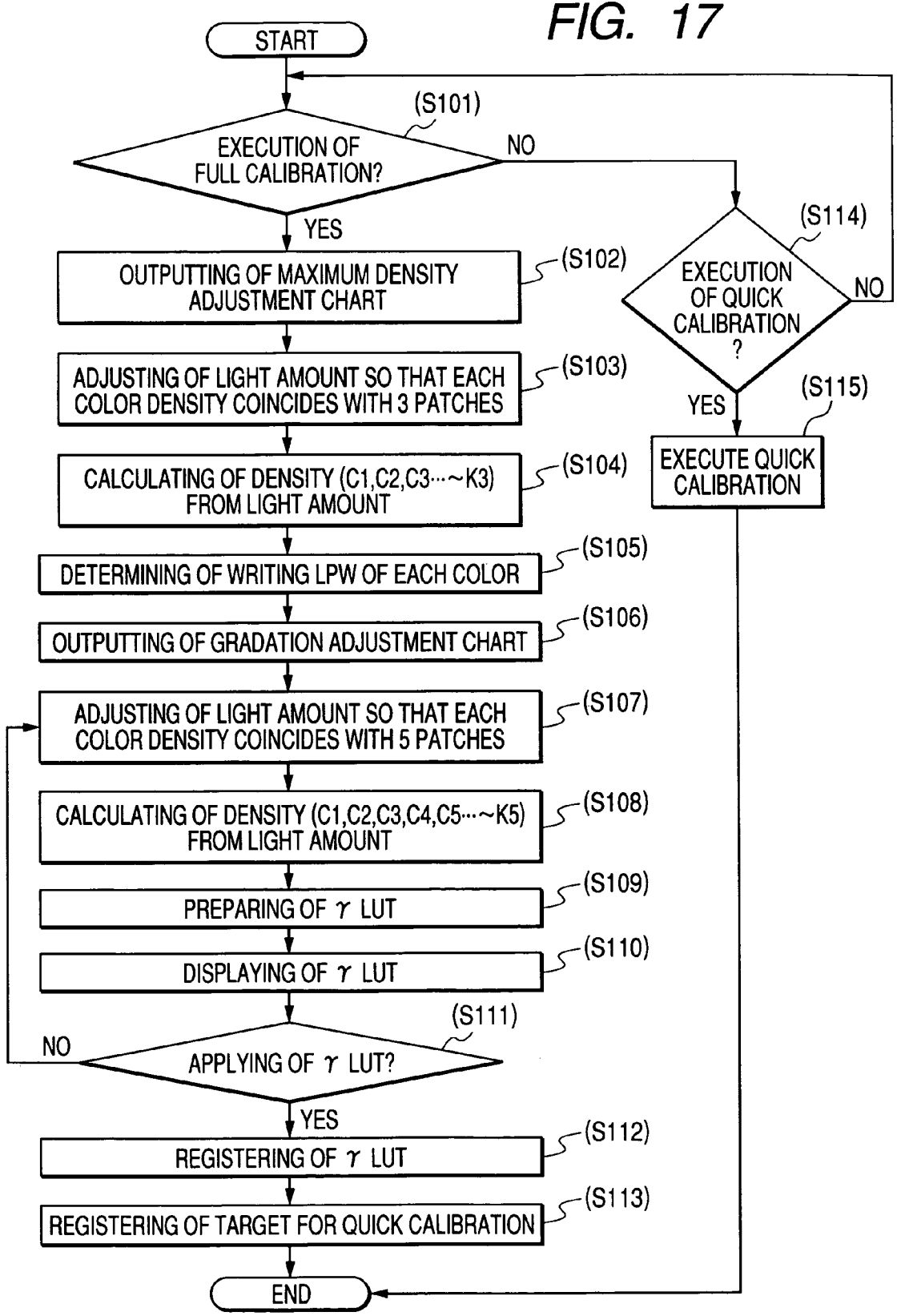
FIG. 17 is a flowchart showing a density correction method according to the first embodiment.

A flow that becomes a basis of the calibration of the image output system, will be described below by using the above described image forming apparatus (printer and printer system) and image projection apparatus. More detail is shown in FIG. 17, and is described below.

The image forming apparatus, which is given an instruction from a user to execute calibration by using the image projection apparatus, forms a reference pattern on the recording paper and outputs it (step 1). At this time, the image projection apparatus is connected to the image forming apparatus by a communication cable as connecting means.

The outputted reference pattern is conveyed to a projection position onto which the image projection apparatus can project light by a conveying apparatus or by the user himself (step 2).

The image projection apparatus projects an image onto the paper (step 3), and the user compares the projected image and the pattern image, and adjusts the output level (light amount) of the image projection apparatus until the densities of the images coincide (step 4).

The condition (setting value) in which the densities coincide is stored, and the γLUT, which is an engine gradation correction means, and the charge potential, the developing voltage and the laser power value of the printer engine, which are the Dmax conditions, are corrected.

(User Interface)

The setting flow of the user will be described with reference to FIGS. 14 to 16.

Figure 14:
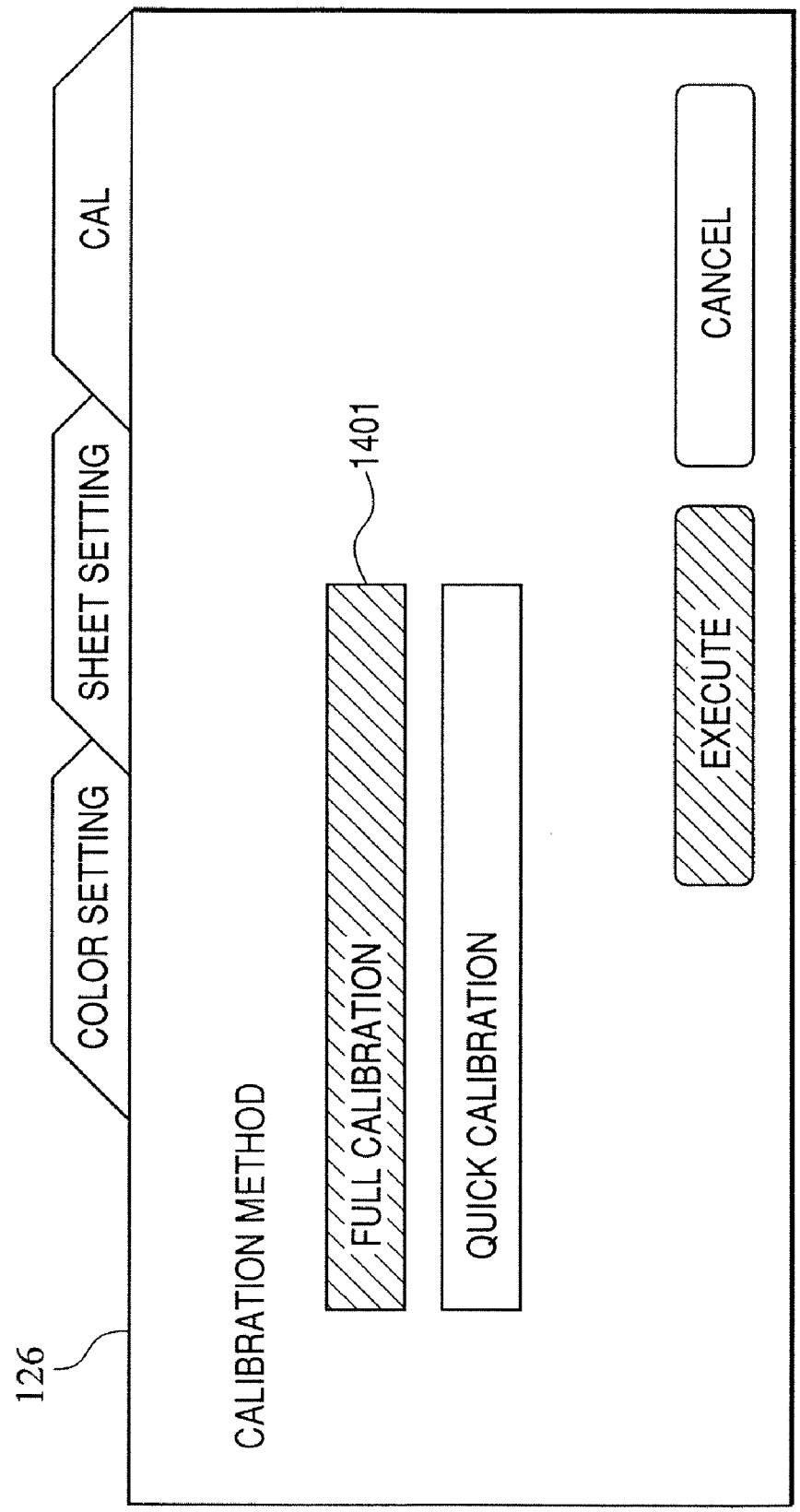
FIG. 14 is a display portion of the image forming apparatus according to the first embodiment.

The display portion 126 of the printer shown in FIG. 14 serves as setting change means for changing various types of settings by a touch panel system. To execute the calibration (hereinafter referred to as "full calibration") using the image projection apparatus in the display portion 126, a "full calibration" button 1401 is selected, and an execution button may be pushed. In contrast, a quick calibration works by performing a detection on an unfixed image by means of the density sensor 9c, which is built inside the printer engine, and corrects the maximum density and the gradation. Since the quick calibration performs detection on the transferring member, it is unable to take into consideration effects from a secondary transferring portion and a fixing device. Hence, to control long-term fluctuation, the execution of the full calibration to determine the density on the paper is desirable.

Figure 15:
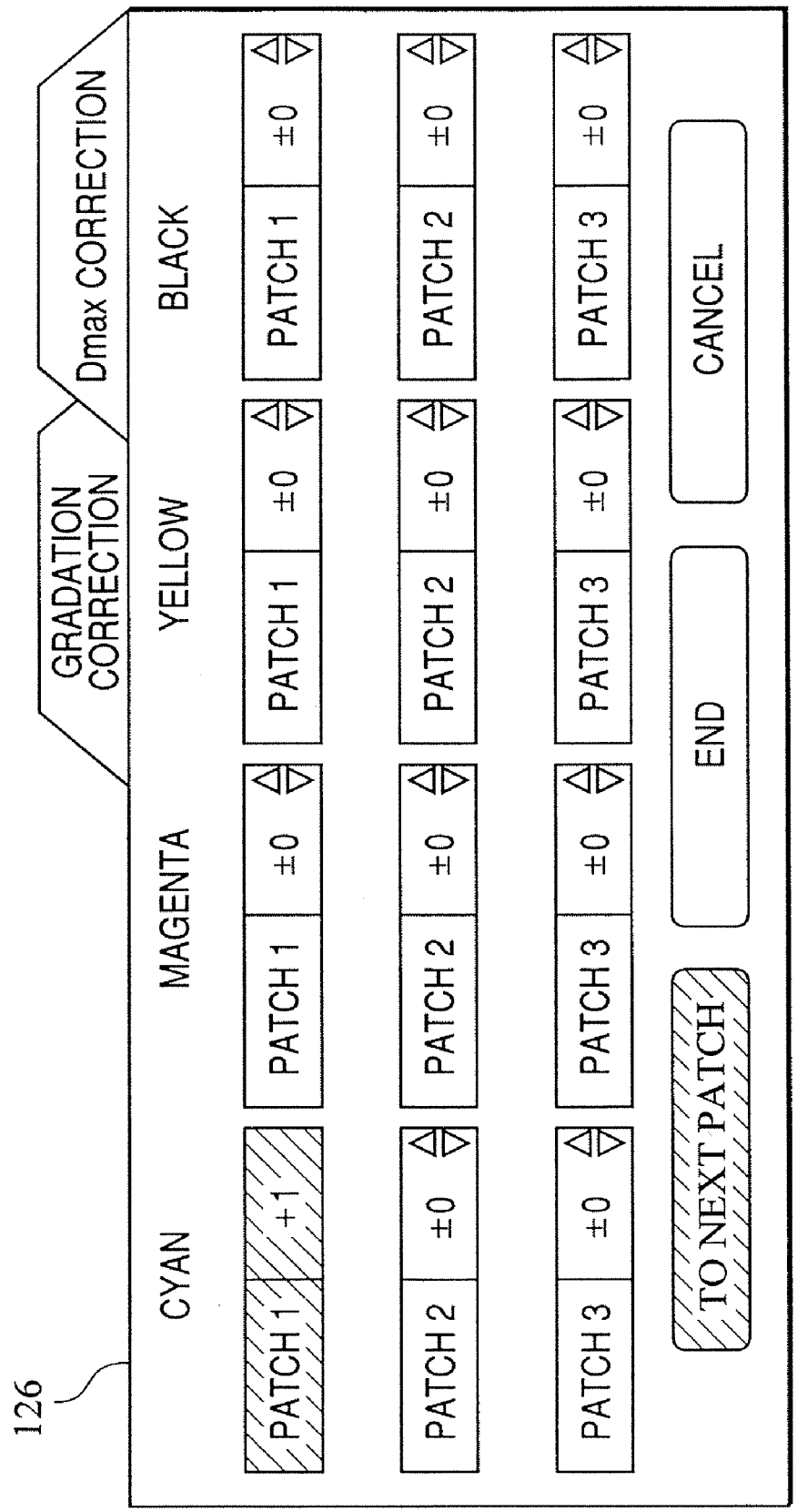
FIG. 15 is one example of the maximum density adjustment panel.

FIG. 15 is an actual maximum density adjustment screen, and when the patch number currently compared is touched, that level can be adjusted. In a case where a numerical value is designated by an input or the values up and down are designated by a symbol ∇, the light amount is changed based on the value inputted to the image projection apparatus through an image projection apparatus interface control portion 132, and the density of the image irradiated on the sheet is changed. The user compares the patch image formed on the sheet and the image similarly projected on the sheet, and changes the numerical value until the densities coincide.

Figure 16:
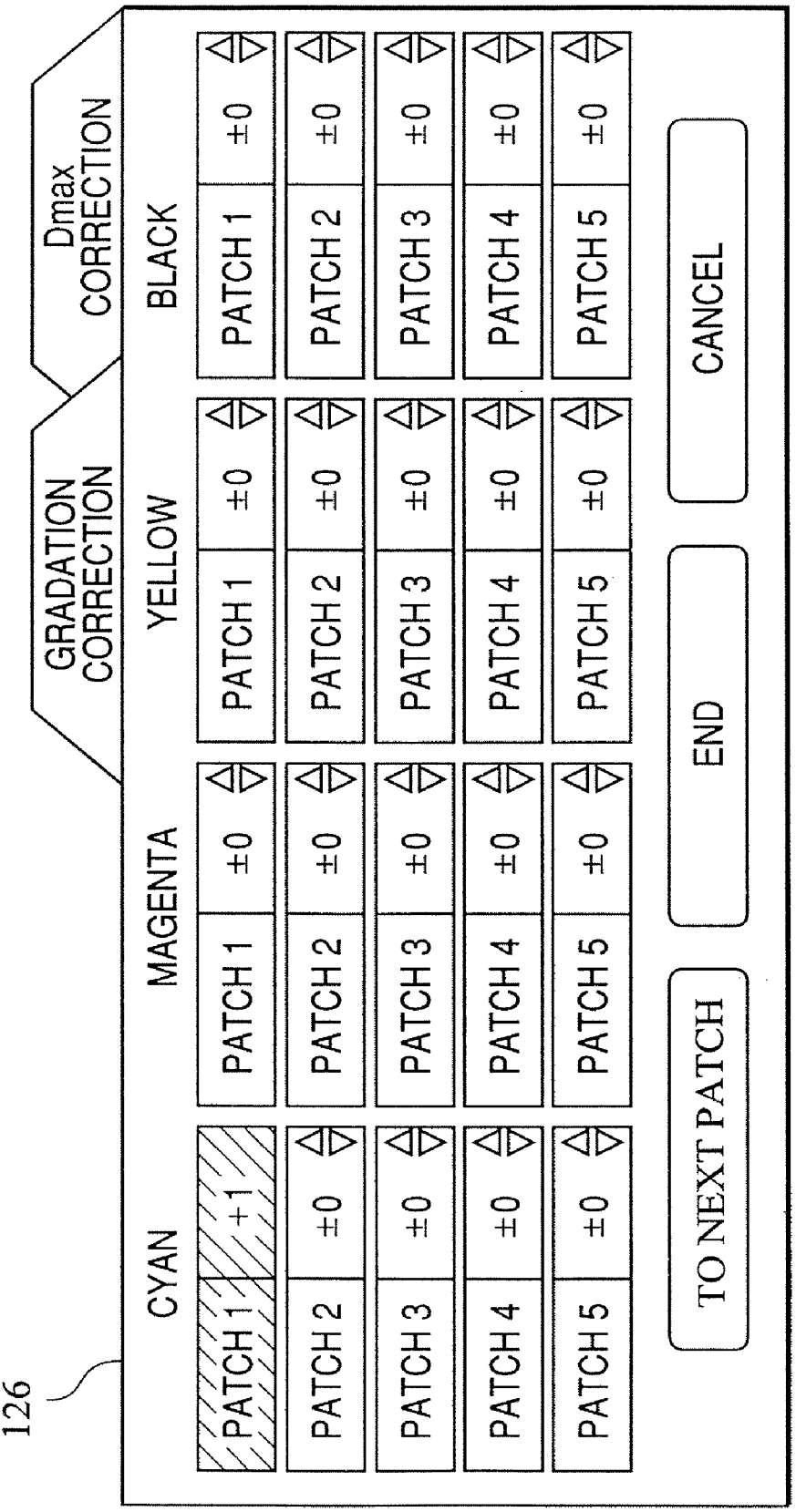
FIG. 16 is one example of the gradation adjustment panel.

Although FIG. 16 is an actual gradation adjustment view, since the adjustment method is the same as FIG. 15, the description thereof will be omitted.

(Detailed Flow of Full Calibration)

A detailed flow of the present embodiment will be described below by using a flowchart drawing 17.

In the display portion 126 shown in FIG. 14, the full calibration or the quick calibration is selected (S101).

The printer system 102, for which the full calibration is selected, issues an output instruction for the outputting of the maximum density adjustment pattern to the printer portion 122, and the printer portion 122 outputs the maximum density adjustment pattern (S102). At this time, the maximum density adjustment pattern is formed with three patches for each color. Further, three patches of the same color are formed by a different laser power (hereinafter referred to as LPW), respectively.

In the meantime, in a case in which quick calibration is selected, the calibration which is completed inside the printer engine is executed without outputting on the sheet (S114 and S115).

The full calibration adjusts the maximum density by using the maximum density adjustment chart in which the LPW value is changed in three stages. The outputted maximum density adjustment pattern is conveyed up to an irradiating area of the image projection apparatus, and the light amount is adjusted by using the display portion 126 so that the density of each patch and the density of the image projected by the image projection apparatus coincide (S103).

From the light amount value (± value of each patch), the density is calculated (S104).

The LPW value, which becomes the maximum density value decided in advance, is found from the three-point computation of the above described Dmax condition. The above-described three points are used to prepare the patch using the LPW value decided at the previous adjustment, and LPW values differing by ±20 percent from that value. Hence, as the density value, the LPW value, which achieves a desired maximum density 1.7, is calculated from the three conditions of the density 1 when the LPW is reduced 20 percent, the normal density 2, and the density 3 when the LPW is increased 20 percent. The calculation method is executed by linear interpolation, but other multi-dimensional interpolations are also acceptable (S105).

Next, the gradation adjustment is taken up. The printer system decided by the LPW value, which achieves the maximum density 1.7, outputs the gradation adjustment pattern by using that LPW value (S106).

Similarly to the maximum density adjustment time, the light amount value of the image projection apparatus is adjusted so that the five patches for each color on the gradation adjustment chart and the density of the corresponding images projected on the light adjustment portion coincide (S107), and from that value, the density of the five-patch portion for each color is calculated (S108).

From the above described five-patch portion, the γLUT which is the input/output characteristic is prepared. For the input signal value, a linear target as the output density is adopted this time. Hence, since the density value is eight bits of 0 to 255, and the input signal is also eight bits of 0 to 255, the output characteristic can be adjusted so that the output density becomes linear for the input signal by preparing a simple inverse transformation LUT (S109).

Since the γLUT prepared as described above is determined by visual perception of the user, it cannot be said that no error absolutely occurs. Hence, the graph of the γLUT is displayed on the display portion for confirmation, and the user is prompted to determine whether or not there is any problem (S110 and S111).

In case it is determined that the prepared γLUT is adaptable, it is stored in a hard disc 127, and is transmitted to an image processing GA 209 through a printer I/F control portion 131, and is registered (S112).

By using the registered γLUT, the patch is formed through a quick calibration target, that is, the LPW value decided by the full calibration and the γLUT, and is read by the toner density sensor 9c, and the toner density at that time is stored as a target (S113). Subsequently, in case the quick calibration is selected, the LPW value and the γLUT are changed so as to become the above described target.

The above-described image projection apparatus is configured in size in such a manner as to be portable by the operator, and the calibration processing can be executed by a simple operation such as connecting this image projection apparatus to the image forming apparatus by a communication cable according to the needs of the operator. If configured in this way, it is more preferable as only one set of the image projection apparatus suffices even for an operator who has a plurality of image forming apparatuses.

Further, a configuration in which the image projection apparatus is integrally fixed to the sheet discharging portion of the image forming apparatus, that is, a product as a state in which the image forming apparatus and the image projection apparatus are integrally formed causes no problem. In this case, as described above, in consideration of operability, a mechanism is preferably provided in which the recording paper carrying the patch discharged from the image forming apparatus is automatically conveyed to the projection area of the image projection apparatus.

Thus, by the above described configuration, a simple image density correction method can be provided without using expensive measuring equipment such as a reader and a concentration meter. Further, a standardized observational condition can be provided without suffering an installation environmental difference (observational environmental difference), which has been a problem of Visual CAL (registered trademark). Further, an image output system with higher accuracy and excellent operability can be provided.

Second Embodiment

A second embodiment according to the present invention will be described.

In the first embodiment, description has been made of the case where the density of a target becoming an object of adjustment at the gradation adjustment time is fixed (described as linear) to the value decided in advance. In the second embodiment, a description will be made of a configuration where, to meet the gradation characteristic of a target (sample) of a certain print, a target becoming the object at the gradation adjustment time can be simply changed. Since the image forming apparatus itself is the same as the first embodiment, description thereof will be omitted, and a description will be made with a focus on the flow of the gradation adjustment.

Figure 18:
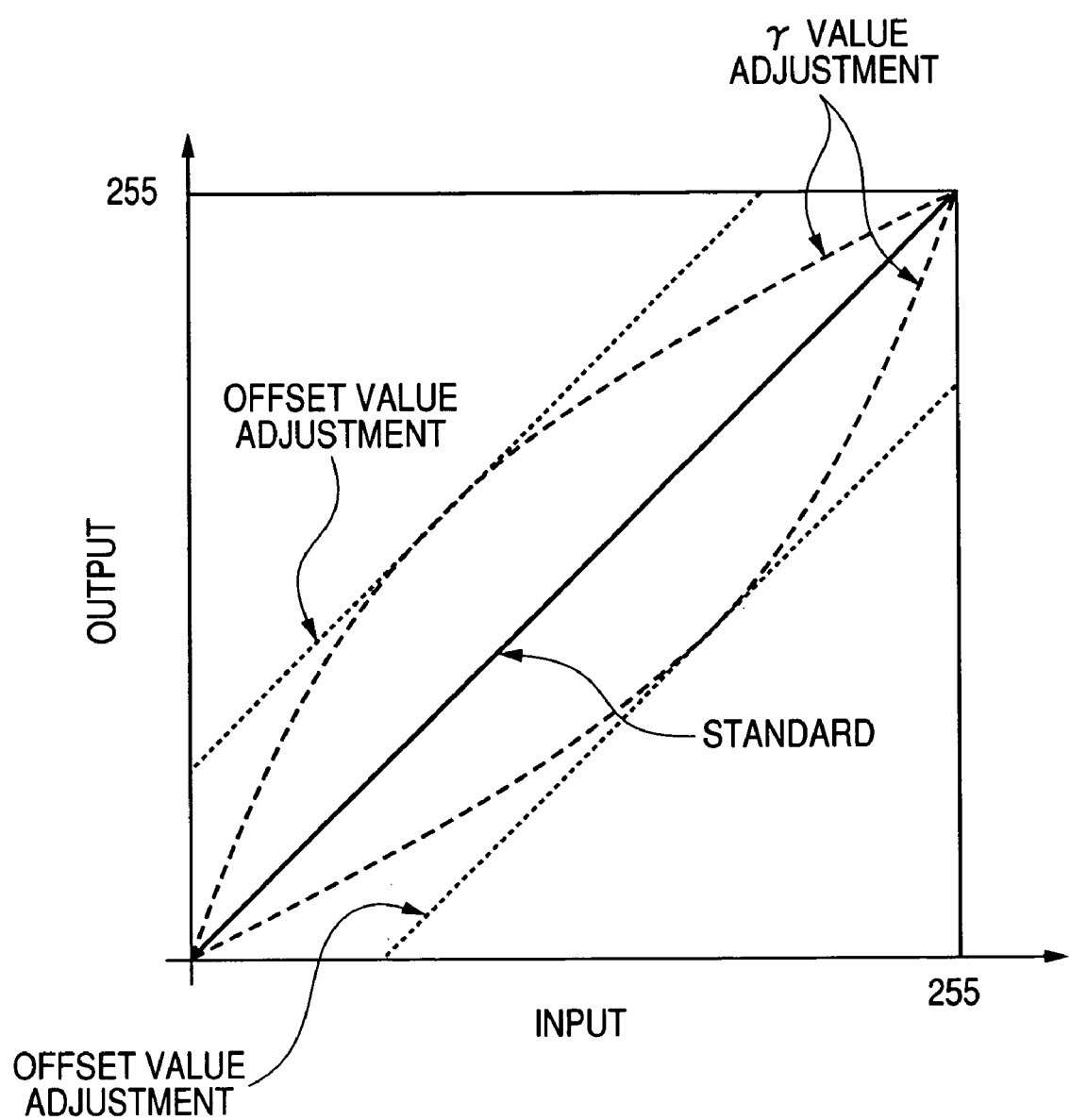
FIG. 18 is a conceptual illustration of the case where the gradation characteristic of an output image density is changed for an input signal.

In the past, there has been a mechanism to change the gradation characteristic of an output image density. For example, as shown in FIG. 18, there is a configuration where the gradation characteristic of an output image density can be arbitrarily changed for an input signal. However, in this configuration, even if a starting point of a γ curve, a γ value (shape of a curve) and the like can be inputted, it is not clear to the user what type of condition the curve itself is based on. Hence, the user is unable to see on which condition (whether it is a status A or a status T or a spectral reflectance density or a filter type and the like) the gradation characteristic is based.

Hence, in the present embodiment, an image forming system is provided, which can easily perform an output at the gradation characteristic desired by each user, that is, which can simply perform a target change with high accuracy without using an expensive concentration meter.

(Basic Flow)

A flow which becomes a basis of the calibration of an image output system using the image forming apparatus (printer and printer system) and an image projection apparatus will be described below.

Printed matter (output matter) which becomes a target is prepared in advance (step 11).

The output signal (halftone dot is often 0 percent) of a patch which measures the density is confirmed (step 12).

The printed matter which becomes a target is conveyed to a projection position projected by image projection apparatus by a conveying device or the user himself (step 13).

For the conveyed printed matter target, a predetermined image is projected by the image projection apparatus (step 14).

The projected image and a reference pattern are compared, and until they coincide, the output level (light amount) of the image projection apparatus is changed (step 15).

The condition (setting value) when coincided is stored, and is registered as a target gradation characteristic (step 16).

By the same method as described in the first embodiment, the output image density is calculated (step 17).

An image processing condition such as a charge potential, a developing voltage, an LPW value of a printer engine and the like, which are a γLUT and a Dmax condition, is adjusted so that the above described output image density becomes the registered density (step 18).

In the present embodiment, though the basic flow is as described above, the characteristic point is that the image (patch) which becomes a target is required, and the change of the corresponding UI is required. This will be described in detail as follows.

(Target Chart)

As described in the first embodiment, it is desirable that a patch size is equal to a two centimeter or greater angle, and that the intervals are spaced apart by one centimeter or more. Further, a graded simple color (C, M, Y, and K) pattern having a ratio of halftone dot from 0 to 100 percent is required. In the second embodiment, a total of 44 patches by a four color portion of 11 patches having a ratio of halftone dot, which become 0 percent, 10 percent, . . . , 90 percent, and 100 percent at intervals of 10 percent are prepared. The number of patches may be decided in consideration of a balance between the user level and the adjustment time. Further, while the patches are outputted in excess, the number of patches actually used for adjustment may be thinned out.

In a case where a specific pattern image cannot be prepared, it does not matter if a patch portion is cut out, and is adhered with a print recording paper, to make an assessment of it.

A user interface for using a patch given such flexibility as described above, will be described below.

(User Interface: UI)

Figure 19:
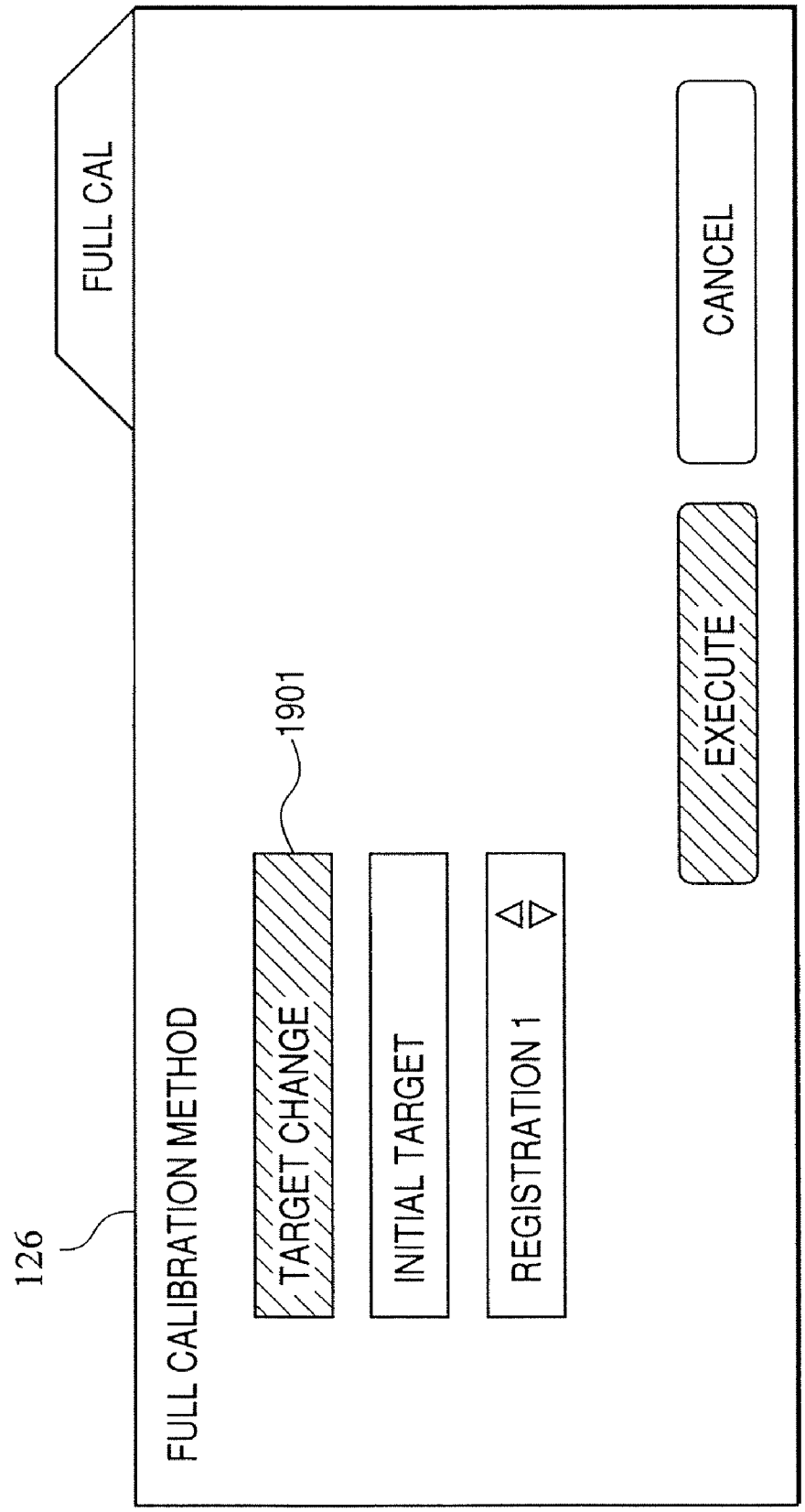
FIG. 19 is a display portion of the image forming apparatus according to a second embodiment.

The UI according to the second embodiment will be described with reference to FIGS. 19 and 20. FIG. 19 is a screen after the full calibration is selected, and whether or not the target change is made is selected. The selection comprises three alternatives, which are a target change, an initial value target, and a registered target. The registered target button (shown here as a tub-style button) can be registered for up to ten targets, and can be identified in the display by an arbitrary easy to understand registered name.

The initial target is a so-called density linear target, in which an output density becomes linear for an input signal similarly to the first embodiment.

The selection of a target change button 1901 leads to the screen of FIG. 20. FIG. 20 shows a halftone dot percent of the patch of each color and the light amount of the image projection apparatus. Similarly to the first embodiment, for every patch which becomes a target, a numerical value is inputted by the reflecting light projected from the image projection apparatus. The halftone dot is standardized to have a level of 0 to 255, and the adjustment can be made for every level. Although ±0 is inputted as an initial value, an actual value is linked to the halftone dot percent, and for example, in the halftone dot of 10 percent, 26 levels, which is a rounding value of (255 level/100 percent)×10 percent, are put in.

Figure 21:
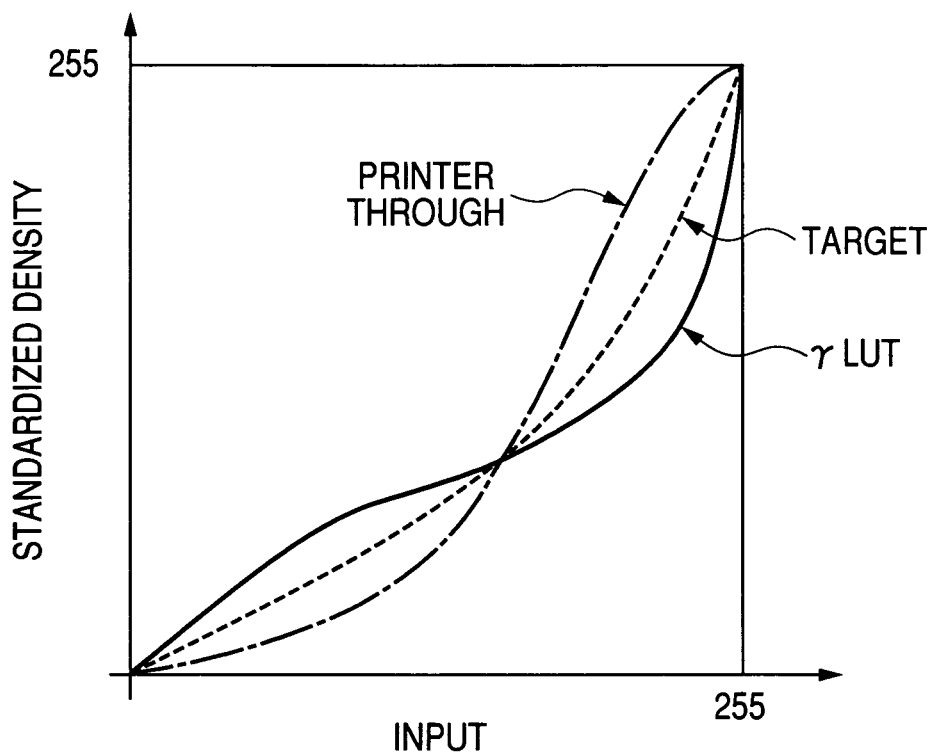
FIG. 21 is a conceptual illustration of a target conversion according to the second embodiment.

By registering the density for every patch, the density characteristic of the image which becomes the target can be obtained. If the γLUT is controlled so as to meet with this target, an output image to coincide the gradation can be obtained. In FIG. 21 is shown its conceptual illustration. The gradation characteristic registered this time is a "target", the gradation characteristic found in the flow of the first embodiment is a "printer through", and an LUT prepared for converting the gradation characteristic of that printer through into the gradation characteristic of the target is a γLUT.

By using the γLUT prepared in this way, the input/output conversion is performed, so that an image forming apparatus having the gradation of the same density characteristic as the target can be provided. Thus, the stability of the printer can be secured, and at the same time, the gradation characteristic according to the user preference can be obtained.

The gamma is a value (G) representing the relation between the input data and the output data, and is based on the following expression:

$$Y = X^{(1/G)}$$

Figure 22:
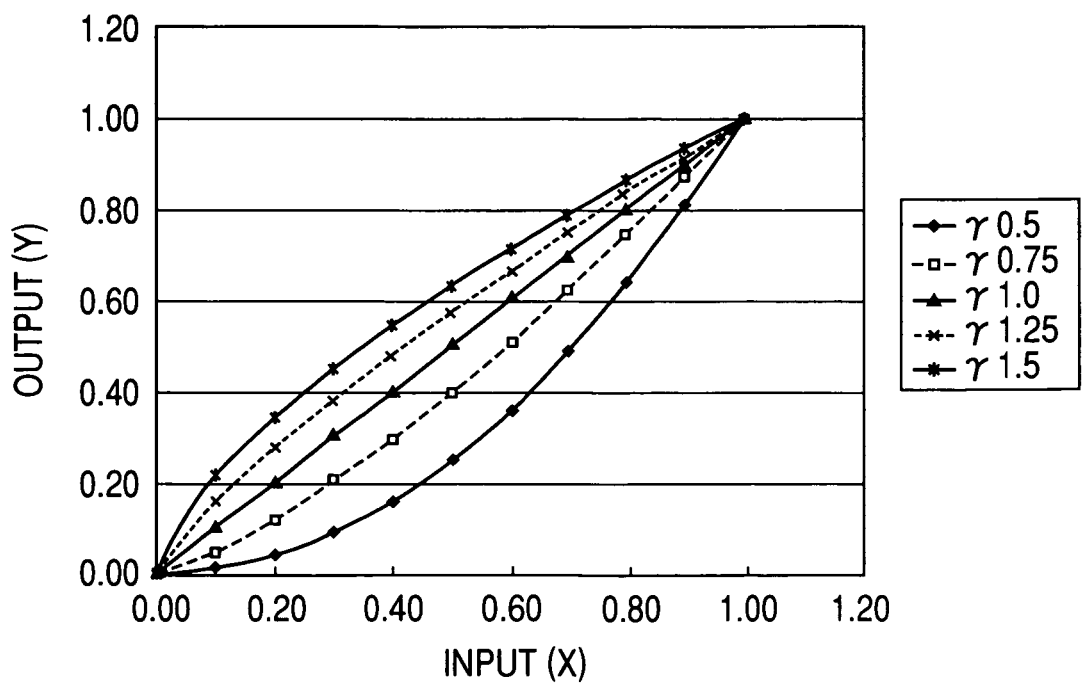
FIG. 22 is a graph showing a correlation between the input and the output by the difference of a γ value.

Here, assuming that X is input data, and Y is output data, a graph in which G has various values from 0.5 to 1.5 is shown in FIG. 22. Particularly when there is no need to change, the value of 1.0 may be entered.

Third Embodiment

In a third embodiment, by using an image projection apparatus, chromaticity is calculated. In the first embodiment, though the calibration of the light source has been executed for the light amount of the single color of RGB by using an APC (Automatic Power Control) function, in the third embodiment, a color balance adjustment flow is added.

Describing specifically, three light sources after the APC are simultaneously subjected to luminous synthesis, and white light is irradiated onto a recording paper, and a white balance processing (adjustment of a whiteness degree) is executed. The adjustment of RGB light may be performed by the reflecting light as follows:

red-tinged→red light only is strong→If red is weakened, it becomes white green-tinged→green light only is strong→If green is weakened, it becomes white blue-tinged→blue light only is strong→If blue is weakened, it becomes white light blue-tinged→red light only is weak→If red is strengthened, it becomes white pink-tinged→green light only is weak→If green is strengthened, it becomes white yellow-tinged→blue light only is weak→If blue is strengthened, it becomes white In cases like this, if the method shown in the right side as described above is adopted, the calibration of the image projection apparatus having achieved a white balance is completed, and the procedure can move to a color correction control (density correction control) flow.

In the third embodiment, though the white color balance adjustment has been performed by using the reflecting light of the recording paper, the reflecting light may be changed to a sensor which can color-detect the sensor portion at the APC time.

(Chromaticity Calculation Method and Basic Flow)

A chromaticity calculation method performs a conversion not by using a one-dimensional calculating expression according to the first and second embodiments, but by using a three-dimensional LUT.

The ICC (International Color Consortium) proposes a conversion dictionary referred to as an ICC profile, which is a basic of the conversion method of a color space not depending on a device and a color space depending on a device, and is a basis of color management.

The image projection apparatus used in the present embodiment uses a color space of RGB, and the image forming apparatus uses a color space of CMYK, and thus both apparatuses use a color space that is dependent on the device. Consequently, even if the display content (combination) of RGB is known, a CMYK value cannot be directly calculated. Hence, if RGB→Lab and Lab→CMYK and two independent multi-dimensional tables are used, the color adjustment can be easily performed.

Describing more specifically, the relation between the RGB signal value of the image projection apparatus and an actual light emission reflecting chromaticity is listed in the ICC profile. After that, the patch desired to be subjected to color measurement is compared to the image projected from the image projection apparatus, and until both of them coincide, the RGB setting value is changed. The relation between the coincided setting value (RGB) and the Lab is written down in the ICC profile, and based on that information, if the conversion is performed, then, the chromaticity Lab of the patch can be known. Simply summing up the above described flow, it becomes as follows.

A multi-dimensional color correction (highly accurate color correction) execution command is issued (step 21).

A prescribed CMYK patch showing the RGB gradation is outputted (step 22).

While the white light after being subjected to the white balance processing is irradiated toward the patch, a plurality of light colors for reproducing the color of the patch are irradiated onto the comparison area. Until the characteristics of the reflected light from the patch area and the comparison area (to be specific, the colors of the reflected light from the patch area and the comparison area) coincide, the light amount of the one light from among at least a plurality of light beams irradiated from the image projection apparatus is adjusted by the user (step 23). A plurality of light beams for reproducing the color of the patch are R+G light in case the color of the patch is yellow, R+B light in case the color of the patch is magenta, and G+B light in case the color of the patch is cyan.

The Lab of the patch is calculated on the base of that adjustment value (RGB) and the ICC profile (Step 24).

The multi-dimensional LUT is amended from the relation between the patch signal value (CMYK) and the Lab (step 25).

(Detection Area)

Figure 23:
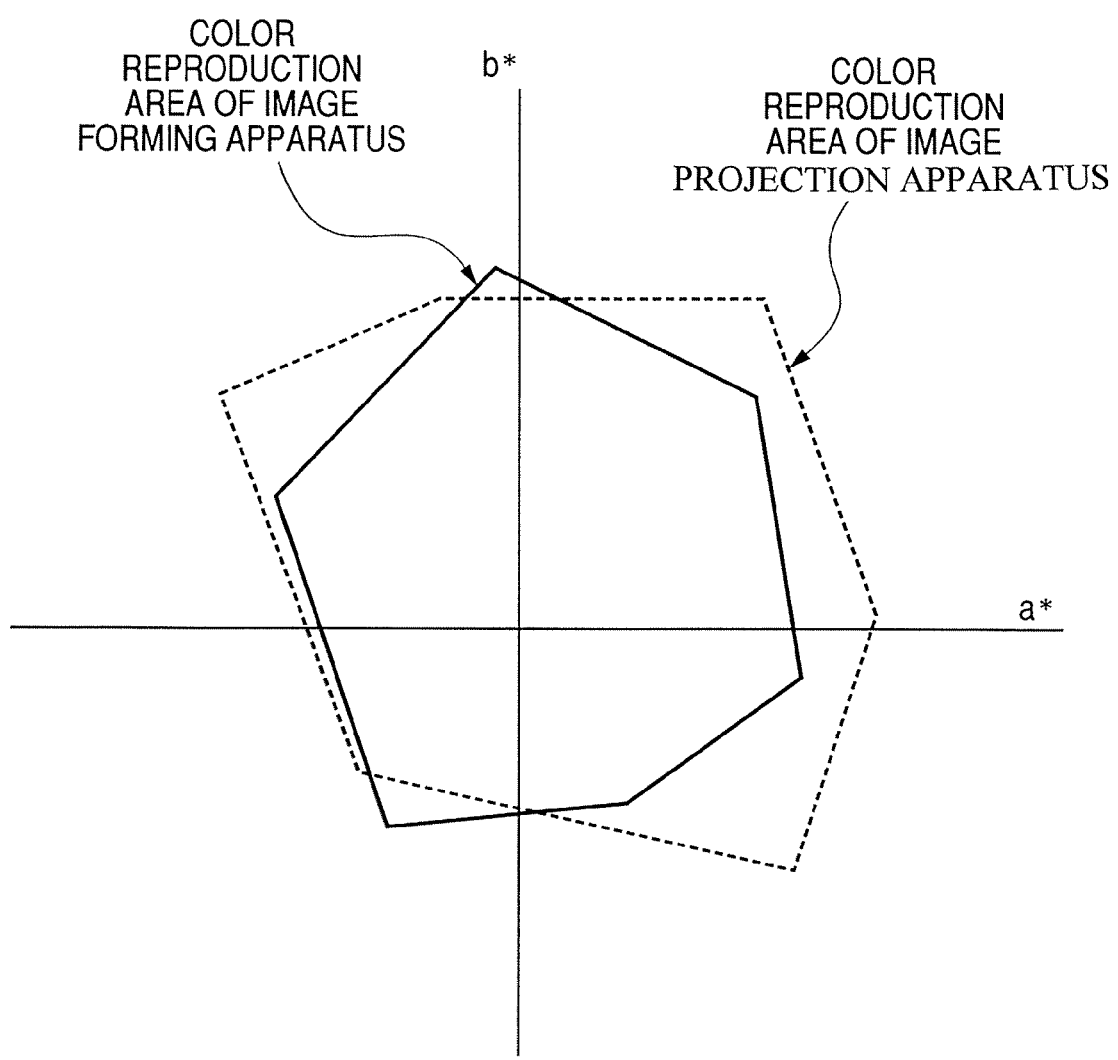
FIG. 23 is one example of color reproduction areas of the image projection apparatus and the image forming apparatus.

Since the image forming apparatus and the image projection apparatus use color spaces that are dependent on the device, the area which can reproduce the color destined to be fixed. If the image projection apparatus covers the entire color reproduction area of the image forming apparatus, an RGB→Lab conversion is performed and chromaticity is calculated, and even if an Lab→CMYK multi-dimensional LUT is adjusted, there occurs no signal loss. However, the image projection apparatus, as shown in FIG. 23, does not necessarily cover the entire color reproduction area of the image forming apparatus. Particularly, as for the single color of the image forming apparatus, the image forming apparatus rather than the image projection apparatus has a wider color reproduction area. Consequently, though the table is corrected by using the color of the area not reproducible by the image projection apparatus, the accuracy is naturally not improved.

Hence, the third embodiment is characterized in that the output patch image in the area reproducible by the image projection apparatus is measured, and a correction is applied to the multi-dimensional LUT.

(Change of Multi-Dimensional Lut)

In the first and second embodiments, based on the density value, the γLUT of the single color (one-dimensional) is changed, whereby the output image of the image forming apparatus is adjusted so as to have a desired density. Within a certain degree of fluctuation, such an adjustment can be sufficiently made. However, when the fixing device and the secondary transferring relative members are exchanged at the end of life, even if the density gradation of the first color comprising the single color agrees with the desired target, it often ends up fluctuating from the initial target in the case of the patch wherein a toner loaded amount of the second color, the third color, and the like, which is overlaid with a plurality of colors, exists aboundingly. That is, even if the gradation characteristic for every single color is allowed to match by density, the gradation characteristics of the second and third color are not matched. Since, in the case of the single color, the gradation is matched, there is no point no matter how much the single color is matched to the single color γLUT.

To match the gradation characteristics of the second and third color, it is necessary to change an Lab→CMYK conversion table similar to the ICC profile, which is a so-called multi-dimensional LUT (Direct Mapping).

Figure 24:
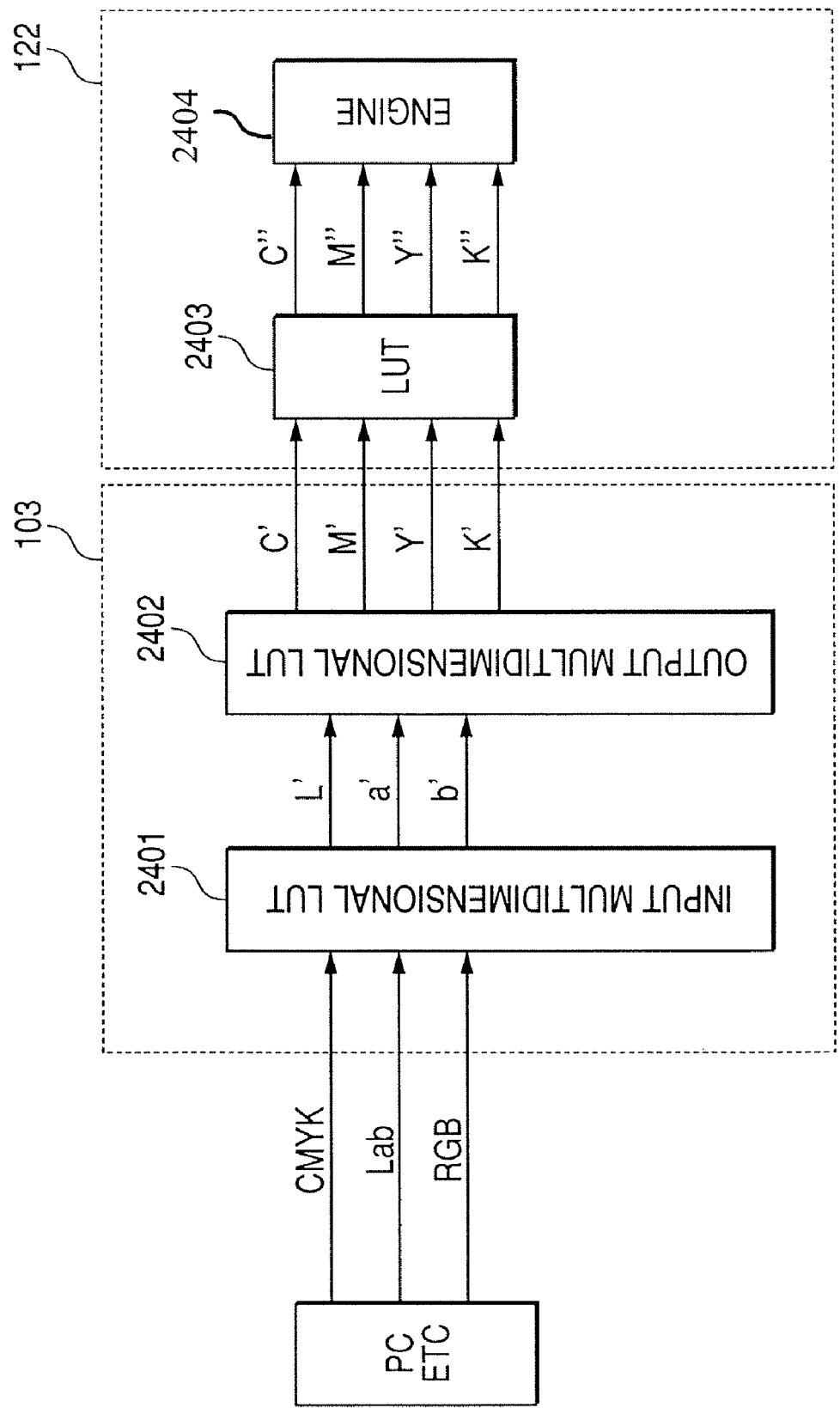
FIG. 24 is a block diagram for explaining a color conversion when a color correction is performed according to a third embodiment.

In FIG. 24 is summed up a color processing flow from the PC. The controller portion 103 receives with a CMYK, a Lab, and an RGB image from the PC and the like, and converts them into a L'a'b' (input multi-dimensional LUT portion 2401) by using the color space information set by the user. In the CMYK color space understandable by the printer portion 122, the L'a'b' is converted into a C"'M'Y'K' by using an output multi-dimensional LUT 2402. In the present embodiment, the above described output multi-dimensional LUT 2402 is changed.

The C"'M'Y'K' value from the output multi-dimensional LUT 2402 is converted into a C"'M"'Y"K" through a single color LUT 2403, and then, it is communicated to an engine portion 2404.

Figure 25:
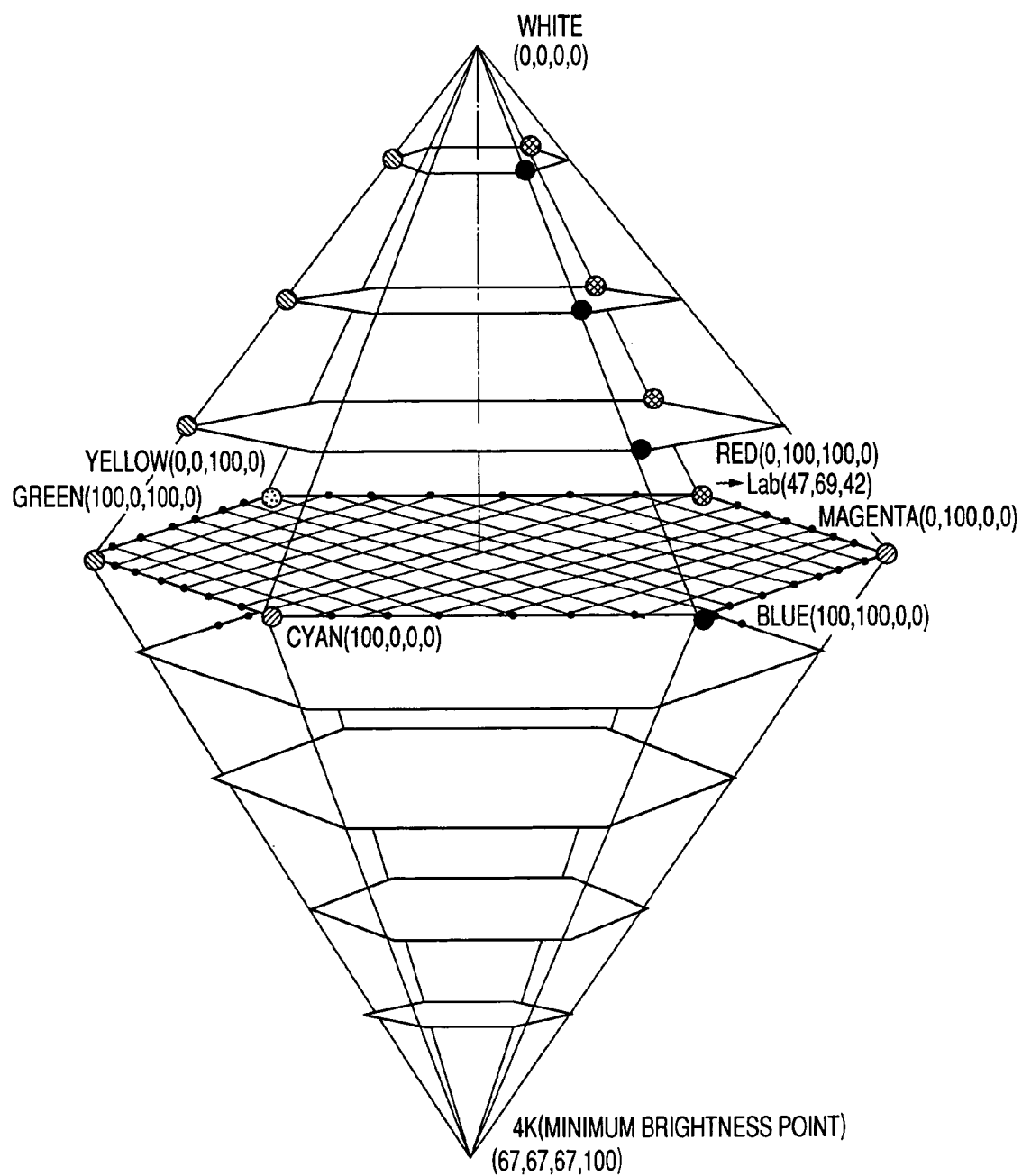
FIG. 25 is a color stereograph conceptual illustration according to the third embodiment.

In FIG. 25 is shown a color solid, wherein a horizontal spread indicates chroma saturation, and a vertical spread indicates brightness, and the drawing corresponds to a chromaticity coordinate. This solid is a conceptual illustration showing by what percent of the CMYK an image can be formed at a certain value of the Lab. For example, the patch in which the maximum chromaticity of red is Y100 percent and M100 percent is the highest in chroma saturation at each + side of the coordinates a-b. This value, if going by the Lab coordinates, is L47, a69 and b42. That is, this solid is a color solid from which it is possible to recognize what CMYK values can form an image given values in the Lab coordinates (L1, a1 and b1).

Based on this color solid, the multi-dimensional LUT that accepts a Lab value as input data and provides CMYK data as output data may be formed.

To change the value of the multi-dimensional LUT thus decided is the feature of the present embodiment. For example, assuming that L=70, a=30, and b=30 is the halftone of red, the CMYK value is C=0, M=50, Y=50, and K=0 from an initial setting output multi-dimensional LUT when a patch is first formed. Then the chromaticity of the image forming apparatus is calculated by using the image projection apparatus (the RGB values of the image projection apparatus are changed until the values coincide, and the patch Lab is calculated by the RGB→Lab conversion table). This calculation data is assumed to be as L=65, a=35, and b=25. From the chromaticity, it is clear that M is strong, that is, the density of M is thick. Hence, the output CMYK value of the initial L=70, a=30, and b=30 is changed from C=0, M=50, Y=50 and K=0 to C=0, M=45, Y=50, and K=0.

By executing such flow in the area in which the color reproduction areas of the image forming apparatus and the image projection apparatus are overlaid, a spot color or a continuous gradation can be maintained, and a fluctuation of the second color due to endurance fluctuation not correctable by the simple color one-dimensional table can be corrected with high accuracy.

According to each of the above described embodiments, the density and color can be simply corrected with high accuracy, and a stable image, which has little fluctuation of the density and the color for a long period of time, can be outputted.

This application claims priority from Japanese Patent Application No. 2004-078462 filed on Mar. 18, 2004, which is hereby incorporated by reference herein.

What is claimed is:

1. An image color correction method, comprising the steps of:
   forming a predetermined image in a first area on a sheet by using an image forming apparatus to apply colorant material to the sheet;
   irradiating a first light from a light irradiating apparatus onto the first area of the sheet, in which the predetermined image is formed on the sheet, and irradiating a second light from the light irradiating apparatus onto a second area on the sheet in a vicinity of but not on the predetermined image;
   adjusting a light amount of the second light to an adjusted light amount, by comparing a characteristic of light reflected from the first area with a characteristic of light reflected from the second area while the first and second areas are illuminated at a level below a predetermined illumination level and adjusting the light amount of the second light until a result of the comparing meets a predetermined criterion; and
   setting an image forming condition of the image forming apparatus based on the adjusted light amount obtained in said adjusting step.

2. The image color correction method according to claim 1, wherein the first light and the second light are a light of a color having a complementary color relation to a color of the predetermined image, and the light amount of the second light is adjusted so that a brightness of the light reflected from the second area substantially coincides with a brightness of the light reflected from the first area.

3. The image color correction method according to claim 2, wherein the image forming apparatus is capable of forming an image by using at least colorant materials of yellow, cyan and magenta, and when the color of the predetermined image is yellow, a blue light is irradiated, and when it is cyan, a red light is irradiated, and when it is magenta, a green light is irradiated.

4. The image color correction method according to claim 1, wherein the first light is a white light, and the second light is a plurality of lights reproducing a color of the predetermined image, and at least a light amount of one from among the plurality of lights is adjusted so that a color of the light reflected from the second area substantially coincides with a color of the light reflected from the first area.

5. The image color correction method according to claim 4, wherein the image forming apparatus is capable of forming an image by using colorant materials of at least yellow, cyan and magenta, and when the color of the predetermined image is yellow, a red light and a green light are irradiated, and when it is cyan, a blue light and the green light are irradiated, and when it is magenta, the red light and the blue light are irradiated.

6. The image color correction method according to claim 5, further comprising a step of correcting a white chromaticity of the white light irradiated toward the sheet from the light irradiating apparatus.

7. The image color correction method according to claim 1, wherein the predetermined illumination level is equal to or below 1.0 lux.

8. The image color correction method according to claim 7, further comprising a step of covering the light irradiating apparatus by light shielding means provided with a visibility window.

9. The image color correction method according to claim 1, further comprising a step of connecting the light irradiating apparatus and the image forming apparatus for transmitting information corresponding to the adjusted light amount from the light irradiating apparatus to the image forming apparatus.

10. An image forming apparatus, comprising:
    image forming means for forming an image on a sheet by applying colorant material to the sheet;
    light irradiating means, said light irradiating means irradiating a first light onto a first area of the sheet, in which a predetermined image has been formed on the sheet by said image forming means, and irradiating a second light onto a second area of the sheet in a vicinity of but not on the predetermined image;
    adjusting means for adjusting a light amount of the second light to an adjusted light amount, by comparing a characteristic of light reflected from the first area with a characteristic of light reflected from the second area below a predetermined illumination level and adjusting the light amount of the second light until a result of the comparing meets a predetermined criterion; and
    setting means for setting an image forming condition of said image forming means based on the adjusted light amount obtained by said adjusting means.

11. The image forming apparatus according to claim 10, further comprising conveying means for conveying the sheet formed with the predetermined image to a position where the sheet can be irradiated by said light irradiating means.

12. The image forming apparatus according to claim 10, wherein the first light and the second light are light of a color having a complementary color relation to a color of the predetermined image, the light amount of the second light is adjusted so that a brightness of the light reflected from the second area substantially coincides with a brightness of the light reflected from the first area.

13. The image forming apparatus according to claim 12, wherein said image forming means is capable of forming an image by using colorant materials of at least yellow, cyan and magenta, and when the color of the predetermined image is yellow, a blue light is irradiated, and when it is cyan, a red light is irradiated, and when it is magenta, a green light is irradiated.

14. The image forming apparatus according to claim 10, wherein the first light is a white light, and the second light is a plurality of lights reproducing a color of the predetermined image, and at least a light amount of one from among the plurality of lights is adjusted so that a color of the light reflected from the second area substantially coincides with a color of the light reflected from the first area.

15. The image forming apparatus according to claim 14, wherein said image forming means is capable of forming an image by using colorant materials of at least yellow, cyan and magenta, and when the color of the predetermined image is yellow, a red light and a green light are irradiated, and when it is cyan, a blue light and the green light are irradiated, and when it is magenta, the red light and the blue light are irradiated.

16. The image forming apparatus according to claim 15, further comprising correcting means for correcting a white chromaticity of the white light irradiated toward the sheet from said light irradiating means.

17. The image forming apparatus according to claim 10, wherein the predetermined illumination level is equal to or below 1.0 lux.

18. The image forming apparatus according to claim 17, further comprising light shielding means for shielding said light irradiating means, said light shielding means being provided with a viewing window.

19. The image forming apparatus according to claim 10, further comprising connecting means for connecting said light irradiating means and said image forming apparatus for transmitting information corresponding to the adjusted light amount from said light irradiating means to said image forming apparatus.

* * * * *